US010296184B2

(12) United States Patent
Jung

(10) Patent No.: US 10,296,184 B2
(45) Date of Patent: May 21, 2019

(54) WEBPAGE NAVIGATION METHOD, MOBILE TERMINAL USING THE SAME, AND VOLATILE STORAGE MEDIUM RECORDING THE SAME

(71) Applicant: Samsung Electronics Co., Ltd., Gyeonggi-do (KR)

(72) Inventor: Sungoo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 14/622,547

(22) Filed: Feb. 13, 2015

(65) Prior Publication Data

US 2015/0234577 A1    Aug. 20, 2015

(30) Foreign Application Priority Data

Feb. 14, 2014    (KR) .................. 10-2014-0017067

(51) Int. Cl.
*G06F 3/0488*    (2013.01)
*G06F 3/0484*    (2013.01)
*G06F 16/955*    (2019.01)

(52) U.S. Cl.
CPC ........ *G06F 3/04842* (2013.01); *G06F 3/0488* (2013.01); *G06F 16/955* (2019.01)

(58) Field of Classification Search
CPC .................. G06F 3/04842; G06F 3/0488
See application file for complete search history.

(56) References Cited

U.S. PATENT DOCUMENTS

| 6,667,751 B1 | 12/2003 | Wynn et al. |
| 8,046,701 B2 | 10/2011 | Chiu et al. |
| 2005/0257400 A1 | 11/2005 | Sommerer et al. |
| 2008/0163090 A1 | 7/2008 | Cortright |

(Continued)

FOREIGN PATENT DOCUMENTS

| CN | 101937461 A | 1/2011 |
| CN | 102314502 A | 1/2012 |

(Continued)

OTHER PUBLICATIONS

Rob Griffiths, "Creating a Tab-Switching Gesture Shortcut in Firefox 3.5", published on Jul. 9, 2009 to https://www.macworld.com/article/1141571/firefoxgestures.html, retrieved on Dec. 18, 2018 (Year: 2009).*

(Continued)

*Primary Examiner* — Shourjo Dasgupta

(57) ABSTRACT

A method for webpage navigation of a mobile terminal includes displaying a first webpage on a screen among a plurality of webpages loaded successively in order of user inputs, receiving a first user input made on the screen, displaying an object pertaining to one of a second webpage that was loaded on the screen right before the first webpage and a third webpage that was loaded on the screen right after the first webpage in response to the first user input, receiving a second user input for selecting the object pertaining to one of the second and third webpages, and re-displaying one of the second and third webpages according to the second user input. A mobile terminal includes a touchscreen and a controller configured to re-display one of the second and third webpages according to the second user input.

18 Claims, 37 Drawing Sheets

(56) References Cited

U.S. PATENT DOCUMENTS

| | | |
|---|---|---|
| 2010/0093325 A1 | 4/2010 | Fang |
| 2010/0093909 A1 | 4/2010 | Miyazawa et al. |
| 2010/0131979 A1* | 5/2010 | Sievert .............. G06Q 30/0254 725/37 |
| 2010/0214237 A1 | 8/2010 | Echeverri et al. |
| 2010/0235733 A1* | 9/2010 | Drislane ............ G06F 3/04883 715/702 |
| 2011/0193985 A1* | 8/2011 | Inoue ................ H04N 5/23216 348/222.1 |
| 2012/0011466 A1* | 1/2012 | Miyamoto ........... G06F 3/0485 715/786 |
| 2012/0131441 A1* | 5/2012 | Jitkoff .............. G06F 17/30905 715/234 |
| 2012/0135694 A1 | 5/2012 | Meier et al. |
| 2012/0166975 A1 | 6/2012 | Oh et al. |
| 2012/0173988 A1 | 7/2012 | Tran et al. |
| 2012/0180001 A1* | 7/2012 | Griffin ................ G06F 3/04883 715/863 |
| 2012/0284638 A1 | 11/2012 | Cutler et al. |
| 2012/0317503 A1 | 12/2012 | Noh et al. |
| 2013/0014013 A1 | 1/2013 | Aoki et al. |
| 2013/0014019 A1 | 1/2013 | Kim et al. |
| 2013/0047060 A1 | 2/2013 | Kwon et al. |
| 2013/0151665 A1 | 6/2013 | Maddali et al. |
| 2013/0226715 A1 | 8/2013 | Lee et al. |
| 2013/0239149 A1* | 9/2013 | Kim .................. H04N 21/2362 725/59 |
| 2014/0173482 A1* | 6/2014 | Hicks .................. G06F 3/0483 715/769 |
| 2014/0380247 A1* | 12/2014 | Tecarro ............... G06F 3/0483 715/863 |
| 2015/0177933 A1* | 6/2015 | Cueto ................. G06F 3/0483 715/776 |
| 2015/0193099 A1* | 7/2015 | Murphy ............... G06F 3/0481 715/777 |

FOREIGN PATENT DOCUMENTS

| | | |
|---|---|---|
| CN | 102326136 A | 1/2012 |
| CN | 102929521 A | 2/2013 |
| CN | 103577446 A | 2/2014 |
| KR | 10-2010-0093909 | 8/2010 |
| KR | 2012 0071670 A | 7/2012 |
| KR | 10-2012-0135694 | 12/2012 |

OTHER PUBLICATIONS

International Search Report dated Apr. 28, 2015 in connection with International Patent Application No. PCT/KR2015/001381, 5 pages.
Extended European Search Report dated May 27, 2015 in copnnection with European Patent Application No. 15154974.8; 5 pages.
History of Firefox; Wikipedia; http://website-archive.mozilla.org/www.mozilla.org/firefox_releasenotes/en-US/firefox/27.0/release-notes/; Feb. 4, 2014; 20 pages.
Office Action dated Aug. 9, 2018 in connection with European Patent Application No. 15 154 974.8, 7 pages.
"FireGestures", Computer Program—Firefox Extension, Version 1.8.2.1, Jan. 17, 2014, 2 pages.
"FireGestures", Versions:Add-ons for Firefox, Jun. 11, 2017, 4 pages.
"Documentation—easystroke", Feb. 19, 2013, 6 pages.
China National Intellectual Property Administration, "Notification of the First Office Action," Application No. CN201580008380.6, dated Mar. 4, 2019, 23 pages.

\* cited by examiner

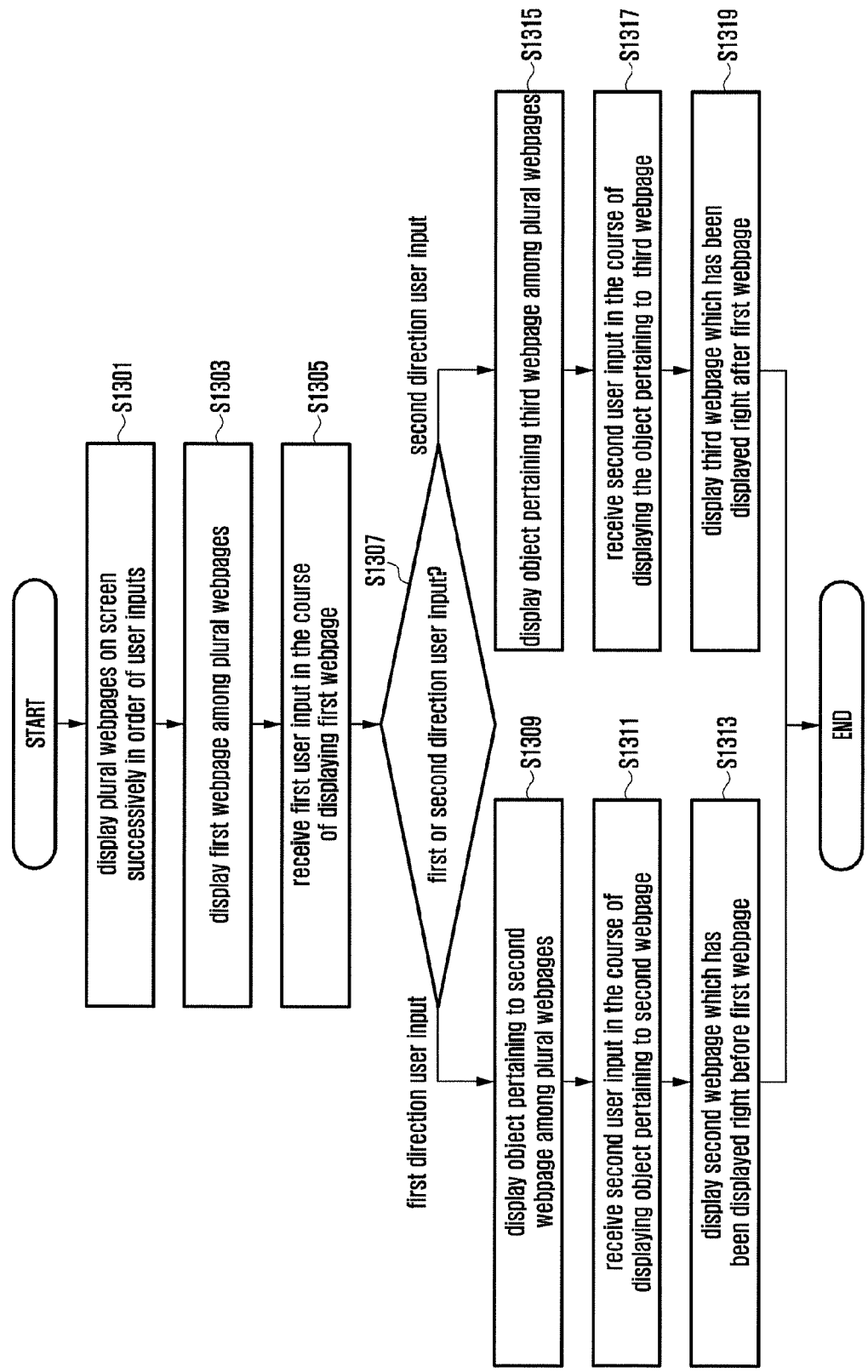

WEBPAGE NAVIGATION METHOD, MOBILE TERMINAL USING THE SAME, AND VOLATILE STORAGE MEDIUM RECORDING THE SAME

CROSS-REFERENCE TO RELATED APPLICATION AND CLAIM OF PRIORITY

The present application is related to and claims the benefit under 35 U.S.C. § 119(a) of a Korean patent application filed on Feb. 14, 2014 in the Korean Intellectual Property Office and assigned Serial No. 10-2014-0017067, the entire disclosure of which is hereby incorporated by reference.

TECHNICAL FIELD

The present disclosure relates to a webpage navigation method and apparatus and, in particular, to a method and apparatus for navigating the webpages that have been displayed.

BACKGROUND

Typically, a mobile terminal is capable of executing a web browser to display a webpage on the screen. For example, the web browser allows the mobile terminal to receive web data from a web server. The received web data are loaded in the form of a webpage. The web data are of web contents such as Hyper-Text Markup Language (HTML) data, java script data, Cascade Style Sheet (CSS) data, Calc Style data, image, text, and the like. The mobile terminal is capable of parsing the web data to arrange the web contents on the screen and downloading and rendering a webpage.

In the case that a webpage is displayed on the screen, the mobile terminal changes the current webpage for a new webpage in response to a user input. For example, if the user enters a web address in the Uniform Resource Locator (URL) window of the web browser, the web browser loadings a new webpage corresponding to the address on the screen of the mobile terminal. In the case that the user selects a link object included in the webpage displayed on the screen, the web browser loads a new webpage linked by the link object on the screen of the mobile terminal.

The menu of the web browser may include icons as shortcuts to web pages that have been displayed on the screen. For example, the web browser menu may include a backward icon to go back to the webpage that was displayed right before the current webpage and a forward icon to go forward to the webpage that was displayed right after the current webpage. If the user selects the backward icon, the browser displays the web page that was displayed right before the current webpage. Also, if the user selects the forward icon, the browser displays the web page that was displayed right after the current webpage.

SUMMARY

When the user selects one of the backward and forward icons included in the menu of the web browser, it may take relatively long time for the web browser to display the webpage that was displayed right before or after the current webpage on the screen again. In the case that the user wants to display the nth webpage before or after the current webpage, the user has to select the forward or backward icon n times, and the loading processes increases the delay of displaying the target webpage. There is therefore a need of a method of reducing the time for loading the previously displayed webpage by skipping unnecessary intermediate webpages loading operations.

To address the above-discussed deficiencies, it is a primary object to provide a webpage navigation method and apparatus that is capable of solving the above problems. Also, the present disclosure provides a webpage navigation method and apparatus that is capable of solving other problems of the conventional webpage navigation methods that are obvious to those skilled in the art in light of the present disclosure.

In accordance with an aspect of the present disclosure, a method for webpage navigation of a mobile terminal includes displaying a first webpage on a screen, receiving a first user input made on the screen, displaying an object pertaining to one of a second webpage that was loaded on the screen right before the first webpage and a third webpage that was loaded on the screen right after the first webpage in response to the first user input, receiving a second user input for selecting the object pertaining to one of the second and third webpages, and re-displaying one of the second and third webpages according to the second user input.

Preferably, displaying the first webpage includes executing a web browser installed in the mobile terminal to display the first webpage of the plurality of webpages, and wherein the re-displaying one of the second and third webpages comprises loading one of the second and third webpages in a state that the web browser is running.

Preferably, displaying the object includes overlaying the object on at least part of the first webpage.

Preferably, the object is one of a thumbnail image, a title, and a favicon of the corresponding webpage.

Preferably, the first to third webpages are different from one another.

Preferably, the webpage navigation method further includes displaying a web browser menu of the web browser installed in the mobile terminal, wherein the web browser menu comprises a backward button to navigate to a webpage displayed right before the first webpage and a forward button to navigate to a webpage displayed right after the first webpage.

Preferably, the webpage navigation method further includes displaying a web browser menu of the web browser installed in the mobile terminal, wherein the first user input is made by one of a flick gesture and a touch and drag gesture made on the web browser menu.

Preferably, the second user input is a touch release gesture made after the flick gesture and the touch and drag gesture.

Preferably, the second user input is made to select the object pertaining to one of the second and third webpages.

Preferably, the webpage navigation method further includes receiving a third user input made onto a web browser menu in a state of displaying the object pertaining to one of the second and third webpages and displaying an object pertaining to one of a fourth webpage that was displayed right before the second webpage and a fifth webpage that was displayed right after the third webpage among the plural webpages in response to the third user input.

Preferably, the object pertaining to one of the fourth and fifth webpages is displayed along with the object pertaining to one of the second and third webpages Preferably, the webpage navigation method further includes determining whether the third user input is received in a predetermined time duration after receiving the first user input, and skipping, when the third user input is received in the predetermined time duration, a display of the object pertaining to one of the second and third webpages, and displaying the object pertaining to one of the fourth and fifth webpages.

In accordance with another aspect of the present disclosure, a webpage navigation method of a mobile terminal includes displaying a first webpage on a screen among a plurality of webpages loaded successively in order of user inputs, receiving one of first and second type user inputs made on the screen, and displaying, when the first type user input is received, one of a second webpage that was displayed on the screen right before the first webpage and a third webpage that was displayed on the screen right after the first webpage and, when the second type user input is received, an object pertaining to one of the second and third webpages.

In accordance with another aspect of the present disclosure, a mobile terminal for navigating webpages includes a touchscreen and a controller configured to control the touch screen to display a first webpage on the touch screen among a plurality of webpages loaded successively in order of user inputs, receiving a first user input made on the touch screen, displaying an object pertaining to one of a second webpage that was loaded on the touch screen right before the first webpage and a third webpage that was loaded on the touch screen right after the first webpage in response to the first user input, receiving a second user input for selecting the object pertaining to one of the second and third webpages, and re-displaying one of the second and third webpages in response to the second user input.

Preferably, the control unit executes a web browser installed in the mobile terminal to display the first webpage of the plurality of webpages, and re-displays one of the second and third webpages by loading one of the second and third webpages in a state that the web browser is running.

Preferably, the control unit controls displaying the object pertaining to one of the second and third webpages on at least part of the first webpage in an overlay manner.

Preferably, the object is one of a thumbnail image, a title, and a favicon of the corresponding webpage.

Preferably, the control unit controls displaying a web browser menu of the web browser installed in the mobile terminal, the web browser menu including a backward button to navigate to a webpage displayed right before the first webpage and a forward button to navigate to a webpage displayed right after the first webpage.

Preferably, the control unit controls displaying a web browser menu of the web browser installed in the mobile terminal, the first user input being made by one of a flick gesture and a touch and drag gesture made on the web browser menu.

Preferably, the control unit controls receiving a third user input made onto a web browser menu in a state of displaying the object pertaining to one of the second and third webpages and displaying an object pertaining to one of a fourth webpage that was displayed right before the second webpage and a fifth webpage that was displayed right after the third webpage among the plural webpages in response to the third user input.

Preferably, the object pertaining to one of the fourth and fifth webpages is displayed along with the object pertaining to one of the second and third webpages.

Preferably, the control unit determines whether the third user input is received in a predetermined time duration after receiving the first user input, and skip, when the third user input is received in the predetermined time duration, a display of the object pertaining to one of the second and third webpages and display the object pertaining to one of the fourth and fifth webpages.

In accordance with another aspect of the present disclosure, a mobile terminal for navigating webpages is provided. The mobile terminal includes a touchscreen and a control unit which controls displaying a first webpage on the touch screen among a plurality of webpages loaded successively in order of user inputs and displaying when the first type user input is received, one of a second webpage that was displayed on the touch screen right before the first webpage and a third webpage that was displayed on the touch screen right after the first webpage and, when the second type user input is received, an object pertaining to one of the second and third webpages.

In accordance with another aspect of the present disclosure, a storage medium storing a webpage navigation program is provided. The webpage navigation program includes processes of displaying a first webpage on a screen among a plurality of webpages loaded successively in order of user inputs, receiving a first user input made on the screen, displaying an object pertaining to one of a second webpage that was loaded on the screen right before the first webpage and a third webpage that was loaded on the screen right after the first webpage in response to the first user input, receiving a second user input for selecting the object pertaining to one of the second and third webpages, and re-displaying one of the second and third webpages according to the second user input.

In accordance with still another aspect of the present disclosure, a storage medium storing a webpage navigation program is provided. The webpage navigation program includes processes of displaying a first webpage on a screen among a plurality of webpages loaded successively in order of user inputs, receiving one of first and second type user inputs made on the screen, and displaying, when the first type user input is received, one of a second webpage that was displayed on the screen right before the first webpage and a third webpage that was displayed on the screen right after the first webpage and, when the second type user input is received, an object pertaining to one of the second and third webpages.

The advantages that can be obtained and predicted in the present disclosure are disclosed directly or implicitly in the detailed description of the embodiments of the present disclosure. The advantages of the present disclosure are not limited to the aforesaid, and other advantages not described herein be clearly understood by those skilled in the art from the descriptions below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 is a flowchart illustrating a webpage navigation method according to an embodiment of the present disclosure;

DETAILED DESCRIPTION

Figure 1:
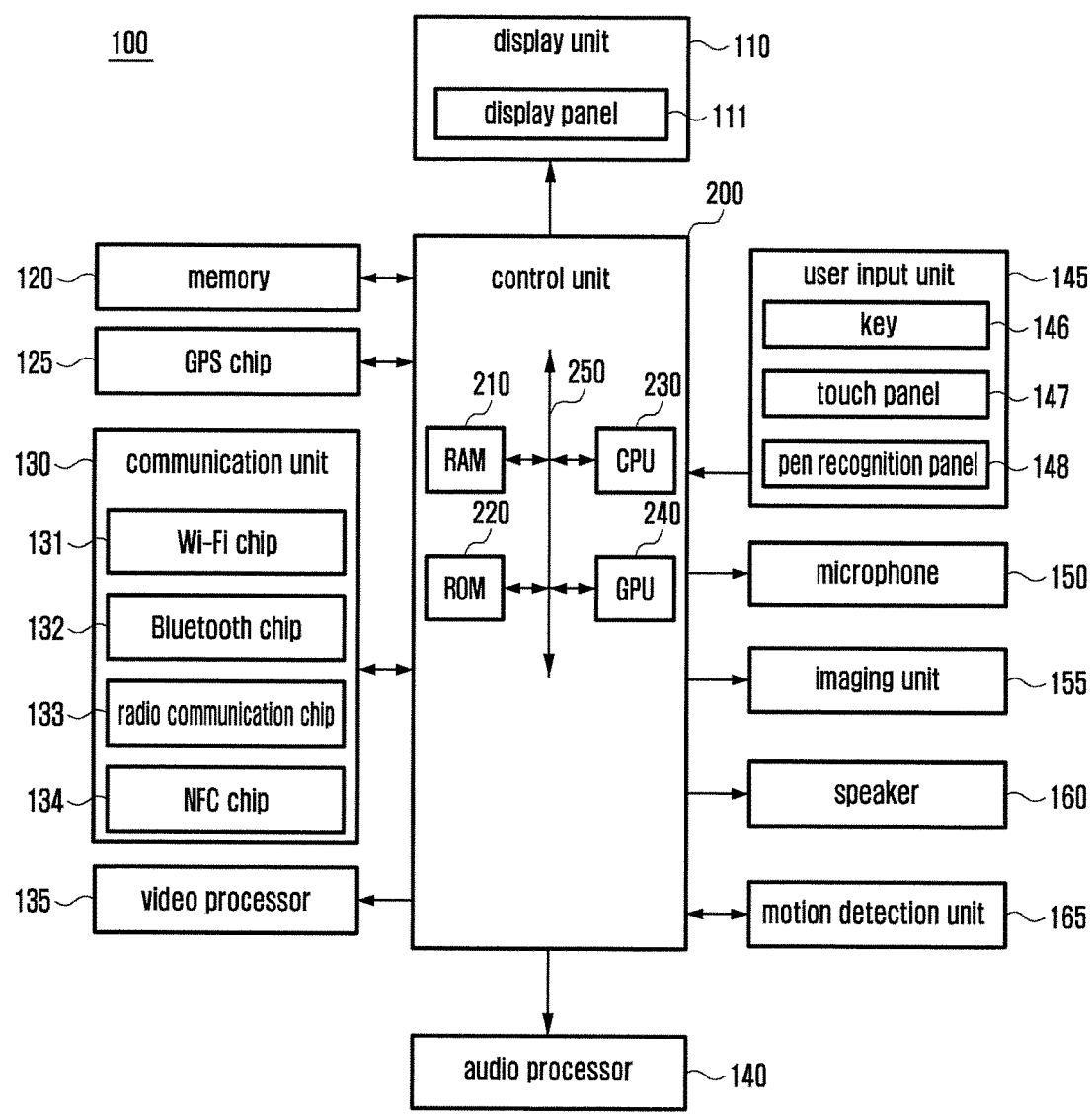
FIG. 1 is a block diagram illustrating a configuration of the mobile terminal according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Exemplary embodiments of the present disclosure are described with reference to the accompanying drawings in detail. Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. Thus, the present disclosure is not limited in the relative sizes of the elements and distances therebetween.

As used herein, the singular forms "a", "an" and "the" are intended to include the plural forms as well, unless the context clearly indicates otherwise. In the present disclosure, the expression "and/or" is taken as specific disclosure of each and any combination of enumerated things.

The term "module" according to the embodiments of the disclosure, means, but is not limited to, a unit of one of software, hardware, and firmware or any combination thereof.

Detailed description of the present disclosure is made with reference to accompanying drawings hereinafter.

FIG. 1 is a block diagram illustrating a configuration of the mobile terminal according to an embodiment of the present disclosure.

The configuration of the mobile terminal 100 of FIG. 1 is applicable to various types of devices including a mobile phone, a tablet Personal Computer (PC), a Personal Digital Assistant (PDA), a MP3 player, a Kiosk, an electronic frame, and a wearable device such as wrist watch and Head-Mounted Display (HMD).

As shown in FIG. 1, the mobile terminal 100 includes a display unit 110, a control unit 200, a memory 120, a Global Positioning System (GPS) chip 125, a communication unit 130, a video processor 135, an audio processor 140, an input unit 145, a microphone 150, an imaging unit 155, a speaker 160, and a motion detection unit 165.

The display unit 110 includes a display panel 111 and a controller (not shown) for controlling the display panel 111. The display panel 111 can be implemented with one of a Liquid Crystal Display (LCD), an Organic Light Emitting Devices (OLED), an Active Matrix OLED (AMOLED), and a Plasma Display Panel (PDP). The display panel 111 can be implemented so as to be flexible, transparent, and/or wearable. The display unit 110 can be implemented as touchscreen integrating the input unit 145 and the touch panel 147. For example, the touchscreen can be implemented by laminating the display panel 111 and the touch panel 137 as an integrated module.

The memory 120 can include at least one of an internal memory and an external memory.

The internal memory can include at least one of a volatile memory (e.g. Dynamic Random Access Memory (DRAM), Static RAM (SRAM), and Synchronous DRAM (SDRAM), a non-volatile memory (e.g. Programmable Read Only Memory (PROM), One Time PROM (OTPROM), Erasable and Programmable ROM (EPROM), Electrically Erasable and Programmable ROM (EEPROM), Mask ROM, and Flash ROM), a Hard Disc Drive (HDD), and a Solid State Drive (SSD). According to an embodiment, the control unit 200 can load a command or data received from at least one of the non-volatile memory and other components on the volatile memory to process. The control unit 200 also can preserve the data received from or generated by other components in the non-volatile memory.

The external memory can include at least one of Compact Flash (CF), Secure Digital (SD), Micro-SD, Mini-SD, extreme Digital (xD), and Memory Stick.

The memory 120 can store various application programs and data related to the operation of the mobile terminal 100. For example, the memory 120 can store a document created by a word processor application or received from an external server (not shown) temporarily or semi-persistently.

The control unit 200 can control the display unit 110 to display a document using an application program and data stored in the memory 120. That is, the control unit 200 is capable of displaying an electronic document on the display unit 110 using the application program and data stored in the memory 120. The control unit 200 can detect a user gesture made on the display unit 110 or the touchscreen and execution an operation corresponding to the user gesture.

The control unit 200 includes a RAM 210, a Rom 220, a Central Processing Unit (CPU) 230, a Graphic Processing Unit (GPU) 240, and a bus 250. The RAM 210, ROM 220, CPU 230, and GPU 240 are connected through the bus.

The CPU 230 loads the Operating System (OS) from the memory 120 to boot up the system. The CPU 230 also executes various programs, contents, and data stored in the memory 120.

The ROM 220 stores a command set for system boot-up. If a turn-on command is input to power on, the CPU 230 copies the OS stored in the memory 120 to the RAM 210 and executes the OS to boot up the system according to the command stored in the ROM 220. If the booting is completed, the CPU 230 copies various programs from the memory 120 to the RAM 210 to execute the programs to perform various operations. If the mobile terminal 100 is booted up, the GPU 240 displays a User Interface (UI) screen on the display unit 110. The GPU 240 can generate a screen displaying an electronic document including various objects such as contents, icons, and menu items. The GPU 240 calculates property values of coordinates, shapes, sizes, and colors of the respective objects in consideration of the layout of the screen. The GPU 240 can generate a screen including the objects in various layouts based on the calculated property values. The screen generated by the GPU 240 is provided to the display unit 110 which displays the screen.

The GPS chip 125 receives GPS signals from GPS satellites to calculate the current location of the mobile terminal 100. In the case of using a navigation program or needing to locate the current location of the user, the control unit 200 calculates the location of the user by means of the GPS chip 125.

The communication unit 130 is responsible for communication with various types of external devices through various communication protocols. The communication unit 130 can include at least one of a Wireless Fidelity (Wi-Fi) chip 131, a Bluetooth chip 132, a radio communication chip 133, and a Near Field Communication (NFC) chip 134. The control unit 200 controls the communication unit 130 for communication with other devices.

The Wi-Fi chip 131 and Bluetooth chip 132 are responsible for Wi-Fi and Bluetooth communication respectively. In the case of using the Wi-Fi chip 131 and the Bluetooth chip 132, various connection information such as a Service Set Identifier (SSID) and a session key are exchanged for use in establishment of a communication link. The radio communication chip 133 can support one of various communication standards such as Institute of Electrical and Electronics Engineers™ (IEEE), Zigbee™, $3^{rd}$ Generation (3G), $3^{rd}$ Generation Partnership Project™ (3GPP), and Long Term Evolution™ (LTE) standards. The NFC chip 134 supports the NFC standard using the 13.56 MHz band among various Radio Frequency Identifier (RF-ID) frequency bands including 135 kHz, 13.56 MHz, 433 MHz, 860-960 MHz, and 2.45 GHz.

The video processor 135 is a component for processing video data included in the contents received by means of the communication unit 130 and stored in the memory 120. The video processor 135 is responsible for processing images, e.g. video data decoding, scaling, noise filtering, frame rate conversion, and resolution conversion.

The audio processor 140 is a component for processing audio data included in the contents received by means of the communication unit 130 and stored in the memory 120. The audio processor 140 is responsible for processing audio data, e.g. audio data decoding, amplification, and noise filtering.

The control unit 200 controls the video and audio processors 135 and 140 to play a multimedia content with the execution of a playback program corresponding to the multimedia content. The speaker 160 outputs the audio data processed by the audio processor 140.

The input unit 145 receives various commands input by the user. The input unit 145 can include at least one of keys 146, a touch panel 147, and a pen recognition panel 148.

The keys 146 can include at least one of various types of keys formed at one of the front, lateral, and rear sides of the mobile terminal 100 such as a mechanical button and a wheel.

The touch panel 147 detects the user's touch gesture and generates a touch event value corresponding to the user's touch gesture. In the case that the touch panel 147 and the display panel 111 are integrated into the touchscreen with various touch sensors such as capacitive, resistive, and pressure-based touch sensors. The capacitive touch sensor is implemented by coating the surface of the touchscreen with conductive material so as to detect the minute electricity excited by contact with some part of human body and generates touch coordinates. The resistive touch sensor is implemented by arranging two electrode plates inside the touchscreen so as to detect the electric current flowing when the tow plates contact each other by the user's touch on the screen and generates the touch coordinates. The touch event is generated by a user's finger touches or a conductive material object which induces change in electric capacity.

The pen recognition panel 148 detects a proximity gesture or touch gesture made with a touch pen (e.g. stylus pen and digitizer pen) and generates a pen proximity event or pen touch event. The pen recognition panel 148 can be implemented in Electron Magnetic Resonance (EMR) type to detect a touch or proximity input based on the change in electromagnetic field strength. The pen recognition panel 148 can include an electric induction coil sensor (not shown) in a grid structure and an electric signal processor (not shown) for providing the loop coil of the electric induction coil with alternative current signal having a predetermined frequency. If a pen having a resonance circuit draws near the loop coil, the magnetic field produced by the loop coil generates electric current based on the electric induction to the resonance circuit. This electric current excites the coil of the resonance coil of the pen to produce the induced magnetic field such that the pen recognition panel 148 detects the induced magnetic field from the loop coil in the state of receiving signals, resulting in detection of proximity position or touch position. The pen recognition panel 148 can be provided with a predetermined size below the display panel 111, e.g. a capable of covering the display area of the display panel 111.

The microphone 150 converts the user's speech and other sounds to audio data. The control unit 200 can process the user's speech input through the microphone 150 in the course of telephone conversation or converts the user's speech to the audio data, which is stored in the memory 120.

The imaging unit 155 takes still and motion pictures under the control of the user. The imaging unit 155 can be provided with multiple cameras, e.g. front and rear cameras.

In the case that the imaging unit 155 and the microphone 150 are equipped, the control unit 200 can control the operation of the mobile terminal 100 according to the user's speech input through the microphone 150 and the user's motion recognized by the imaging unit 155. That is, the mobile terminal 100 can operate in a motion control mode and voice control mode. In the motion control mode, the control unit 200 activates the imaging unit 155 to take pictures of the user and track the change of the user's motion to control the mobile terminal 100 based on the tracking result. In the voice control mode, the control unit 200 analyzes and recognizes the user's speech input through the microphone 150 to control the operation of the mobile terminal 100 based on the recognition result.

The motion detection unit 165 detects the motion of the mobile terminal 100. The mobile terminal 100 can be rotated or tilted in various directions. The motion detection unit 165 detects motional components such as rotation direction and angle and tilt using at least one of a geomagnetic sensor, a gyro sensor, and an acceleration sensor.

Although not shown in FIG. 1, the mobile terminal 100 can further include a Universal Serial Bus (USB) port for connection with a USB connector, an external input port for connection of a headset, a mouse, and Local Area Network (LAN) module, a Digital Multimedia Broadcasting (DMB) chip for receiving DMB signals, and various sensors.

The names of the aforementioned components of the mobile terminal 100 can be changed. According to an embodiment of the present disclosure, the mobile terminal 100 can implemented with or without at least one of the above enumerated components and others.

Figure 2:
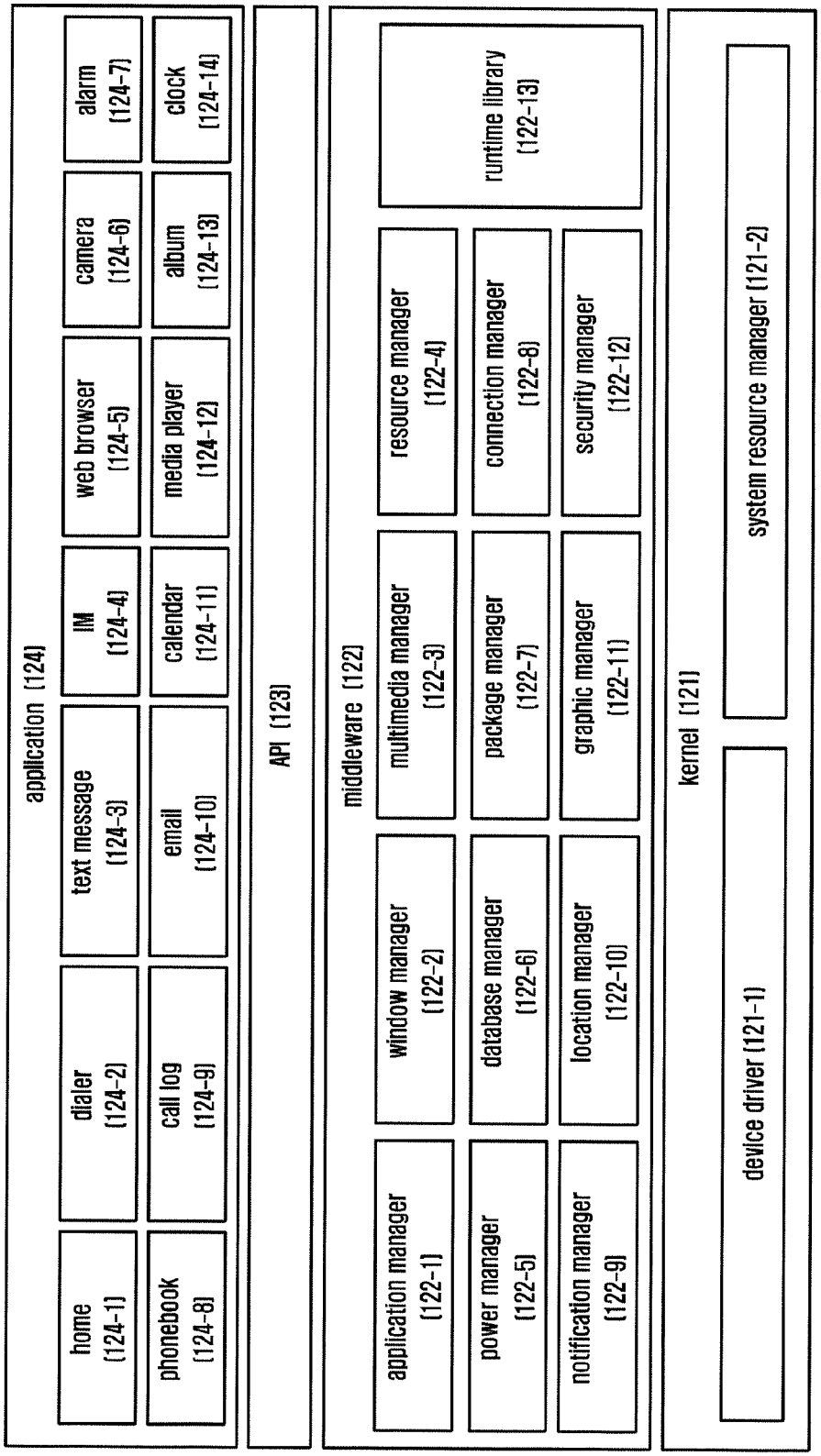
FIG. 2 is a block diagram illustrating a software configuration of a mobile terminal according to an embodiment of the present disclosure.

FIG. 2 is a block diagram illustrating a software configuration of a mobile terminal according to an embodiment of the present disclosure.

As shown in FIG. 2, the memory stores an Operating System (OS) for controlling resource of the mobile terminal and application programs. The OS can include a kernel 121, a middleware 122, and an Application Programming Interface (API). Examples of the OS include Android™, iOS™, Windows™, Symbian™, Tizen™, and Bada™.

The kernel 121 can include at least one of a device driver 121-1 and a system resource manager 121-2. The device driver 121-1 makes it possible to control the hardware of the mobile terminal 100 in software manner. In order to accomplish this, the device driver 121-1 can include interfaces and hardware provider-specific driver modules. Examples of the device driver 121-1 include a display driver, a camera driver, a Bluetooth driver, a common memory driver, a USB driver, a keypad driver, a Wi-Fi driver, an audio driver, and an Inter-Process Communication (IPC) driver. The system resource manager 121-2 can include at least one of a process manager, a memory manager, and a file system manager. The system resource manager 121-2 is responsible for system resource control, allocation, and withdrawal functions.

The middleware 122 can include a plurality of modules pre-configured to assist the functions commonly necessary for various applications. The middleware 122 provides the functions necessary for use of the internal resource of the mobile terminal efficiently through the API 123. The middleware 122 includes at least one of an application manager 122-1, a window manager 122-2, a multimedia manager 122-3, a resource manager 122-4, a power manager 122-5, a database manager 122-6, a package manager 122-7, a connection manager 122-8, a notification manager 122-9, a location manager 122-10, a graphic manager 122-11, and a security manager 122-12.

The application manager 122-1 can manage the life cycle of at least one of the applications 124. The window manager 122-2 can manage GUI resource concerning the screen. The multimedia manager 122-3 checks the formats necessary for playback of various media files and performs encoding or decoding of multimedia files using the codec matching the format. The resource manager 122-4 can manage the resource such as source code, memory, and storage space of at least one of the applications 124. The power manager 122-5 operates along with a Basic Input/Output System (BIOS) to manage the battery or power source and provide power information necessary for the operation. The database manager 122-6 can manage to generate, search, or change a database for use by at least one of the applications 124. The package manager 122-7 can manage installation and update of the application distributed in the form of a package file. The connection manager 122-8 can manage wireless connection, e.g. Wi-Fi and Bluetooth. The notification manager 122-9 can display or notify to the user an event such as incoming message, schedule, and proximity without disturbance. The location manager 122-10 can manage location information on the electronic device. The graphic manager 122-11 can manage the graphic effect and user interface therefor to be provided to the user. The security manager 122-12 can provide security function necessary for the system security and user authentication. In the case that the mobile telephony 100 is provided with the telephony function, the middleware 122 can further include a telephony manager (not shown) for managing the voice and video telephony functions of the electronic device.

The middleware 122 can further include a runtime library 122-13 and other library modules (not shown). The run-time library 122-13 is a library module for use by a compiler to add new function through a programming language in the course of execution of the application. For example, the runtime library 122-13 can be responsible for input/output, memory management, arithmetic function, etc. The middleware 122 generate and use a new middle ware module by combining various functions of the aforementioned internal component modules. The middleware 122 can provide OS-specific modules for providing distinct functions. The middleware 122 can delete some of components or add new components dynamically. Accordingly, it is possible to omit some of components enumerated in the embodiments of the present disclosure, add other components, or substitute some with other components similar in function but called in different names.

The API 123 is a set of API programming functions provided differently depending on the OS. For example, an API set is provided per platform in the case of Android™ or iOS™, and the two or more API sets in the case of Tizen™.

The application 124 can include the preloaded applications installed as default and third party application installed in the course of using the mobile terminal. The applications 124 include a home application 124-1 for returning to the home screen, a dialer for placing a call to a phone number, a text messaging application 124-3 for receiving message from a peer identified by phone number, an Instant Message (IM) application 124-4, a web browser application 124-5, a camera application 124-6, an alarm application 124-7, a phonebook application 124-8 for managing contacts including phone numbers and addresses, a call log application 124-9 for managing call logs, inbound and outbound text message logs, and missing call logs, an email application 124-10 for receiving emails from the peers identified by email addresses, a calendar application 124-11, a media player application 124-12, an album application 124-13, and a clock application 124-14. The names of the above enumerated software components can be changed depending on the type of the OS. The software according to the present disclosure can be implemented with at least one of the above enumerated components and other components not mentioned.

Figure 3:
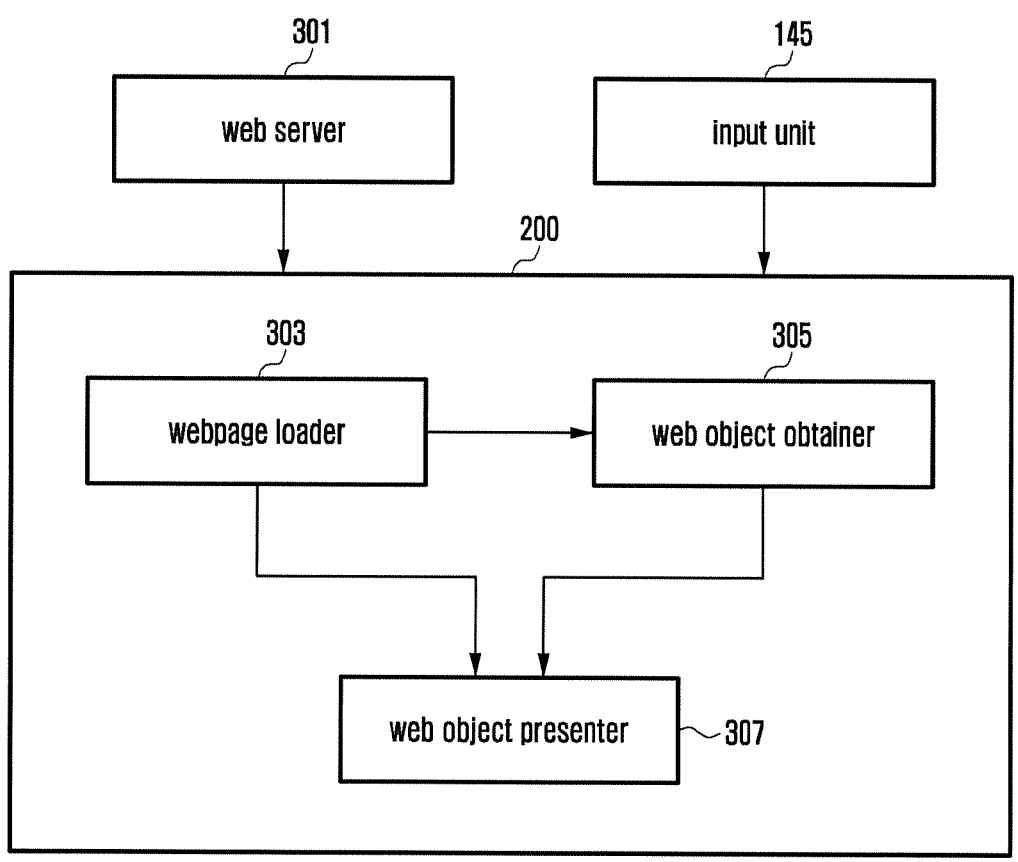
FIG. 3 is a block diagram illustrating a configuration of the control unit of the mobile terminal of FIG. 1.

FIG. 3 is a block diagram illustrating a configuration of the control unit of the mobile terminal of FIG. 1.

Referring to FIG. 3, the control unit 200 includes a webpage loader 303, a web object obtainer 305, and a web object presenter 307.

The webpage loader 303 receives web data pertaining to the webpage from the web server 301 and loads the webpage using the received web data. The webpage loader 303 is responsible for parsing web data and downloading, arranging, and rendering web contents. For example, the webpage loader 303 receives the web data pertaining to the webpages that have been loaded on the screen before and after the current webpage and loads the webpage using the received web data in response to the webpage navigation signal input by the user through the input unit 145.

The web object obtainer 305 extracts the objects pertaining to the webpage. The objects pertaining to the webpage can include webpage thumbnails and favicons representing webpage titles or log images. The web object obtainer 305 can obtain the objects from the webpage loader 303 or the memory 120 in the course of loading the webpage. The memory 120 can store the objects acquired from the web server 301 and/or other external servers. The web object obtainer 305 also can capture the webpage on screen to generate a thumbnail image of the webpage.

The web object presenter 307 is responsible for rendering the objects pertaining to the webpage on the screen of the display unit 110. The web object presenter 307 renders such that the objects are overlaid on parts of the webpage. For example, the web object presenter 307 renders the objects pertaining to the webpages which have been displayed before and after the current webpage on the current webpage in an overlay manner.

The control unit 200 can support various user interactions with the aforementioned components. Descriptions are made of the user interaction methods according to various embodiments in detail hereinafter.

FIGS. 4A through 4D are diagrams illustrating exemplary screen displays for explaining a page navigation procedure according to an embodiment of the present disclosure.

Figure 4A:
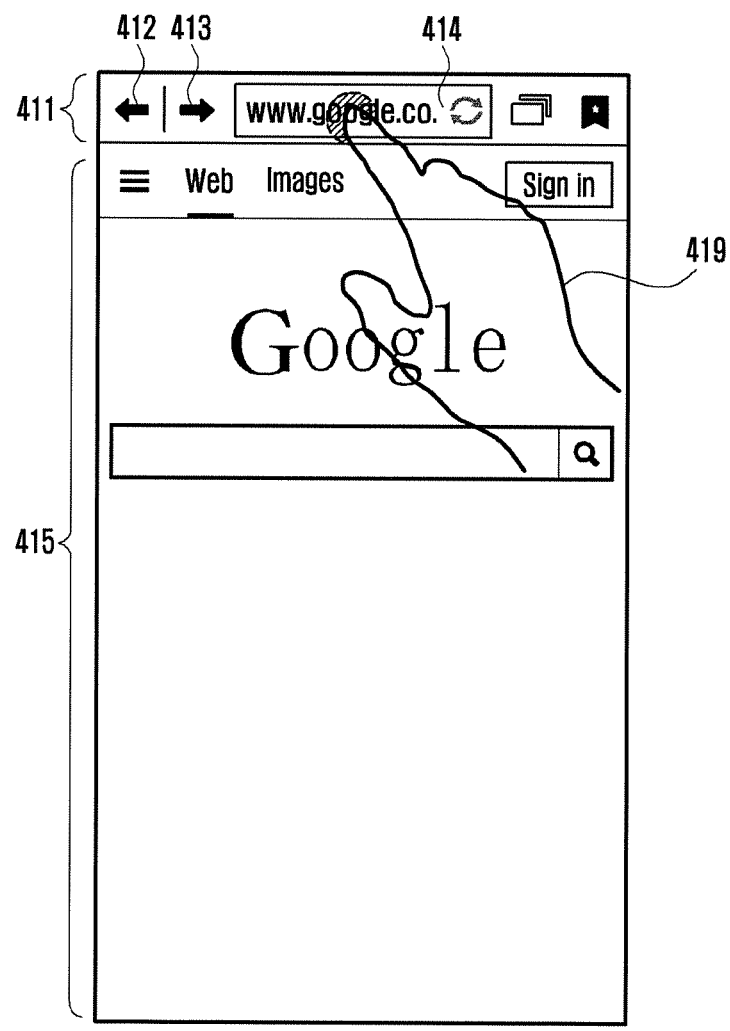
FIGS. 4A through 4D are diagrams illustrating exemplary screen displays for explaining a page navigation procedure according to an embodiment of the present disclosure.

Referring to FIG. 4A, the control unit 200 executes the web browser with its execution screen having a web browser menu (e.g. URL bar) 411 and the first webpage 415. The web browser menu 411 can include a backward button 412 for navigation to the webpage that was displayed before the current webpage, a forward button 413 for navigation to the webpage that was displayed after the current webpage, an address window (e.g. URL editor) 414 for entering a web address. If there are the webpages that was displayed on the screen right before or after the current webpage, the backward and forward buttons 412 and 413 are activated. Since FIG. 4A shows the initial execution screen of the web browser that was executed right before, the backward and forward icons 412 and 413 are in the deactivated state.

The control unit 200 can detects a user input for navigating from the first webpage 415 to a second webpage 425. If the user selects the address window, the control unit 200 controls do display a soft keyboard (not shown) for input of a new web address. The control unit 200 receives a web address input by the user using the soft keyboard.

Figure 4B:
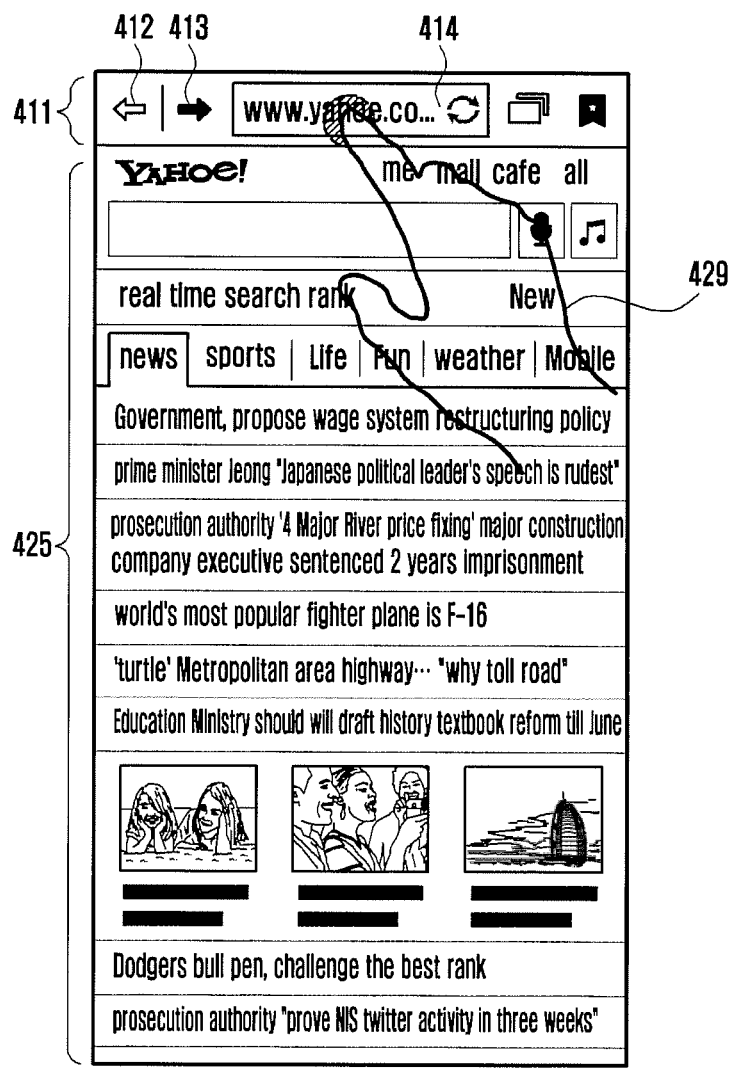

Referring to FIG. 4B, the control unit 200 loads the second webpage 425 on the screen in response to the user input 419. In this case, since the second webpage 425 displayed in subsequently to the first webpage 415, the backward button 412 is activated in the web browser menu 411. If the backward button 412 is activated, this means that there is the first webpage 415 that was displayed right before the second webpage 425 and, if necessary, it is possible to load the first webpage 415 on the screen by selecting the backward button 412.

The control unit 200 can receive the user input (as denoted by reference number 429) for navigating to a third webpage 435 in the course of displaying the second webpage 425. For example, the control unit 200 can receive a new web address entered by the user in the address window. The control unit 200 also can receive the user input for selecting a link object included in the second webpage 425.

Figure 4C:
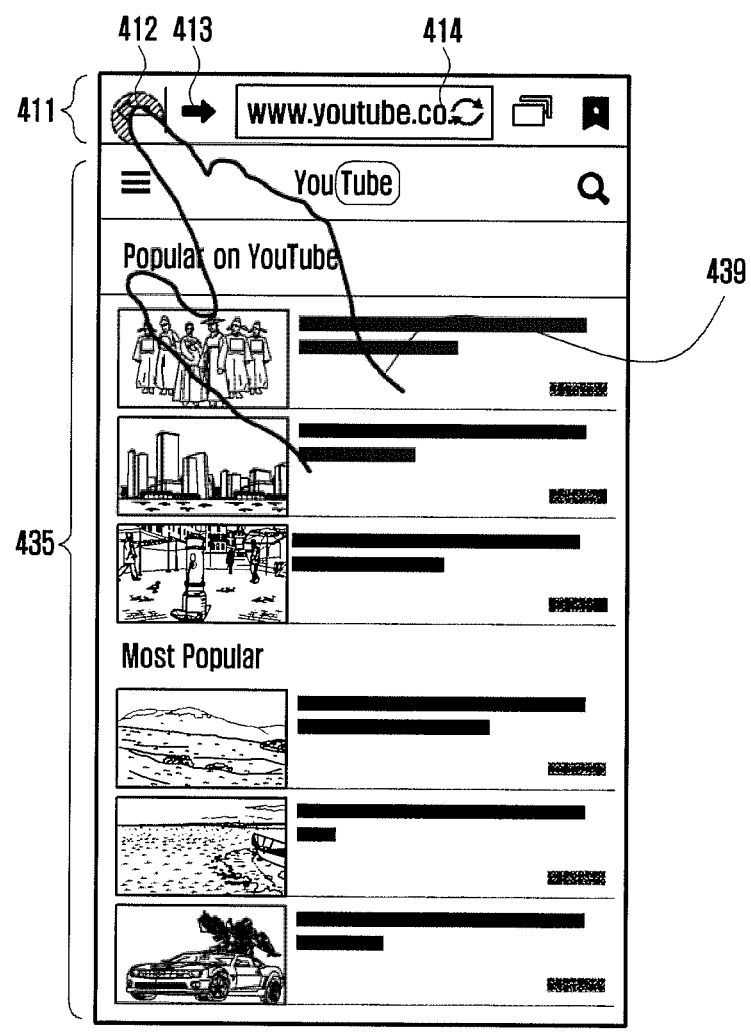

Referring to FIG. 4C, the control unit 200 can display the third webpage 435 on the screen in response to the user input made as denoted by reference number 429. In this case, since the second webpage 425 has been displayed right before the third webpage 435, the backward button 412 is activated in the web browser menu 411.

The control unit 200 can receive a user input made as denoted by reference number 439 to go back to the second webpage 425 in the course of displaying the third webpage 435. For example, the control unit 200 can receive the user's tap gesture for selecting the backward button 412 of the web browser menu 411.

Figure 4D:
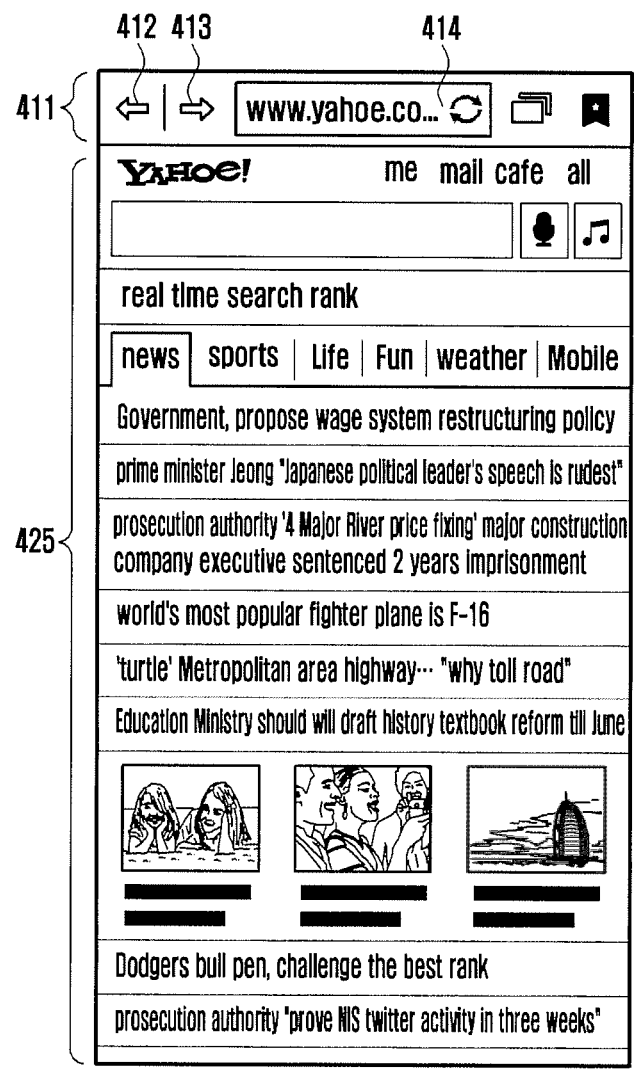

Referring to FIG. 4D, the control unit 200 displays the second webpage 425 on the screen again in response to the user input as denoted by reference number 439. In this case, both the backward and forward buttons 412 and 413 are activated in the web browser menu. If the backward button 412 is activated, this means that the first webpage 415 that was displayed right before the second webpage can be loaded on the screen again. If the forward button 413 is activated, this means that the third webpage 435 that was displayed right after the second webpage 425 can be loaded on the screen again.

In the case that a plurality of webpages 415, 425, and 435 have been displayed in order, the control unit 200 is capable of displaying one of the webpages in response to the user input made by selecting one of the navigation buttons.

In the course of displaying one of the webpages 415, 425, and 435, the web browser 124-5 is in the executed state without being terminated. If the web browser 124-5 ends and restarts, the backward and forward buttons 412 and 413 can be in the deactivated state. If the backward and forward buttons 412 and 413 are deactivated due to the restart of the web browser 124-5, this means that there is no webpage that was displayed before or after of the current webpage.

Figure 5A:
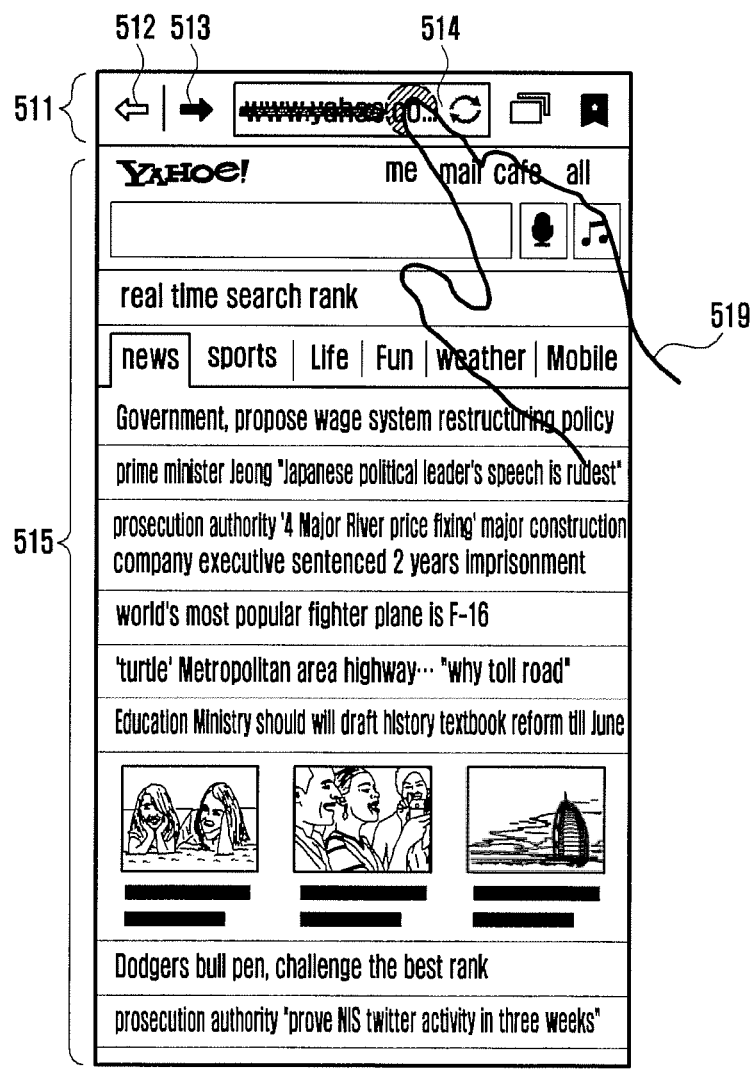
FIGS. 5A through 5C are diagram illustrating exemplary screen displays for explaining a webpage navigation procedure according to another embodiment of the present disclosure.
Figure 5B:
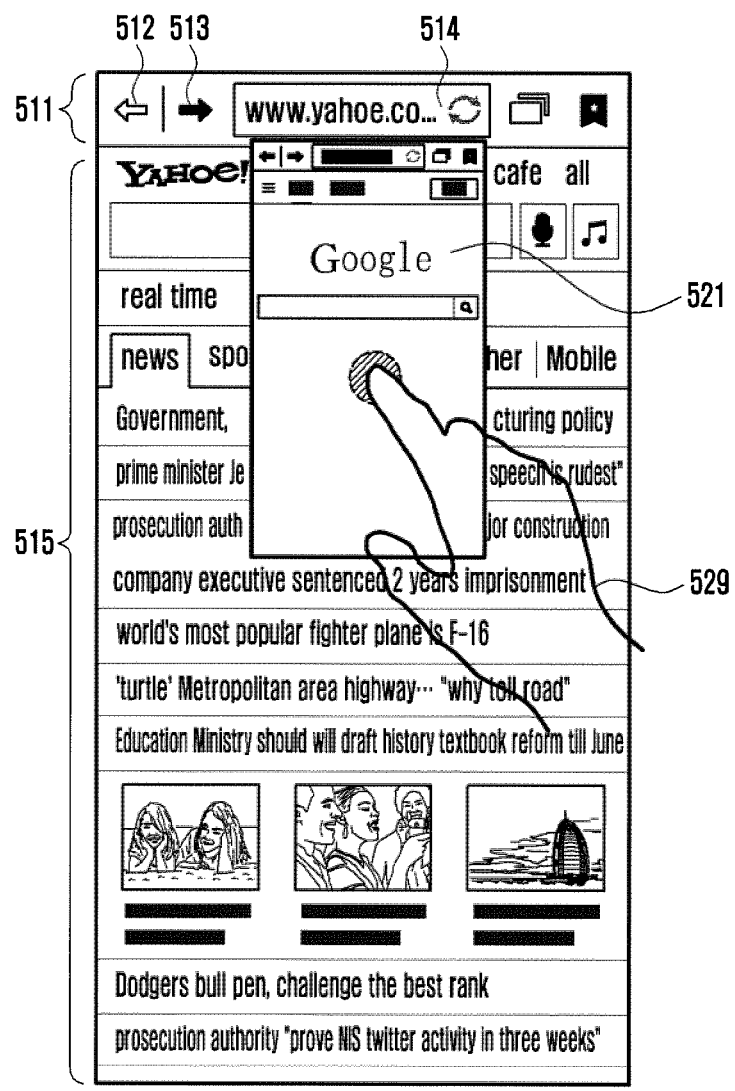
Figure 5C:
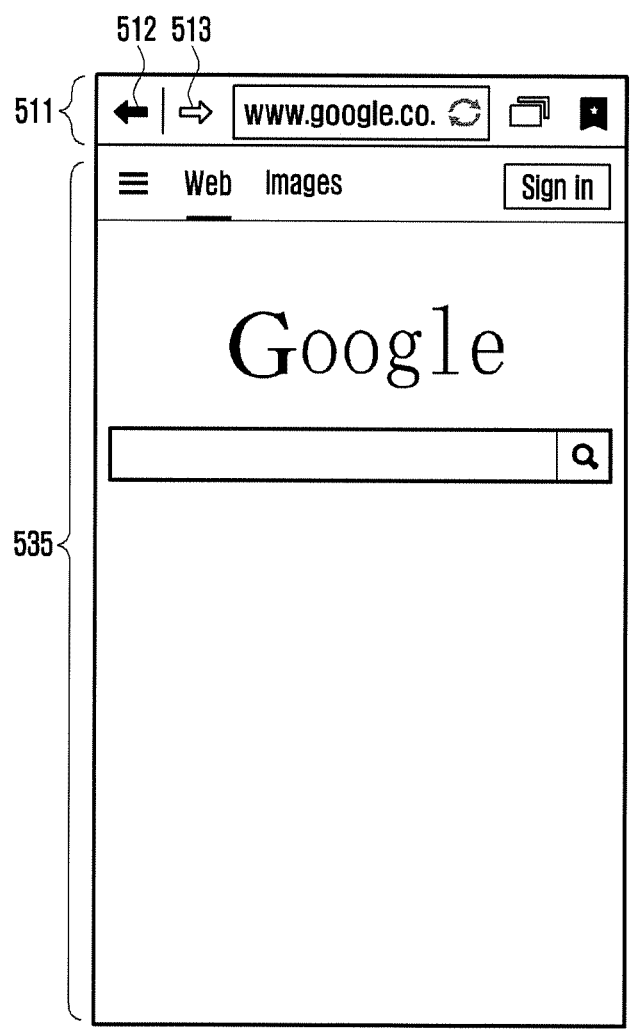

FIGS. 5A through 5C are diagram illustrating exemplary screen displays for explaining a webpage navigation procedure according to another embodiment of the present disclosure;

Referring to FIG. 5A, the control unit 200 displays the first webpage 515 on the screen among a plurality webpages. In this case, the backward icon 512 of the web browser menu 511 is displayed in the activated state.

The control unit 200 can receive a user input made as denoted by reference number 519 in the course of displaying the first web page 515. For example, the control unit 200 can detect a user's flick gesture or touch and drag gesture made in a certain direction (e.g. right direction) on the web browser menu 511 (particularly, address window).

Referring to FIG. 5B, the control unit 200 displays the object 521 pertaining to the second webpage that was displayed right before the first webpage 515 in response to the user input. The object 521 pertaining to the second webpage can be a thumbnail image of the second webpage. The thumbnail image 521 of the second webpage can be displayed in an overlay manner. In this case, the thumbnail image 521 of the second webpage can be displayed opaquely, transparently, or blinkingly on the first webpage 515.

The control unit 200 can receive a user input made as denoted by reference number 529 in the course of displaying the thumbnail image 521 of the second webpage. For example, the control unit 200 can detect a user's tap gesture on the thumbnail image 521 of the second webpage.

Referring to FIG. 5C, the control unit 200 loads the second webpage 535 that was displayed on the screen right before the first webpage 515 in response to the user input as denoted by reference number 529.

Figure 6A:
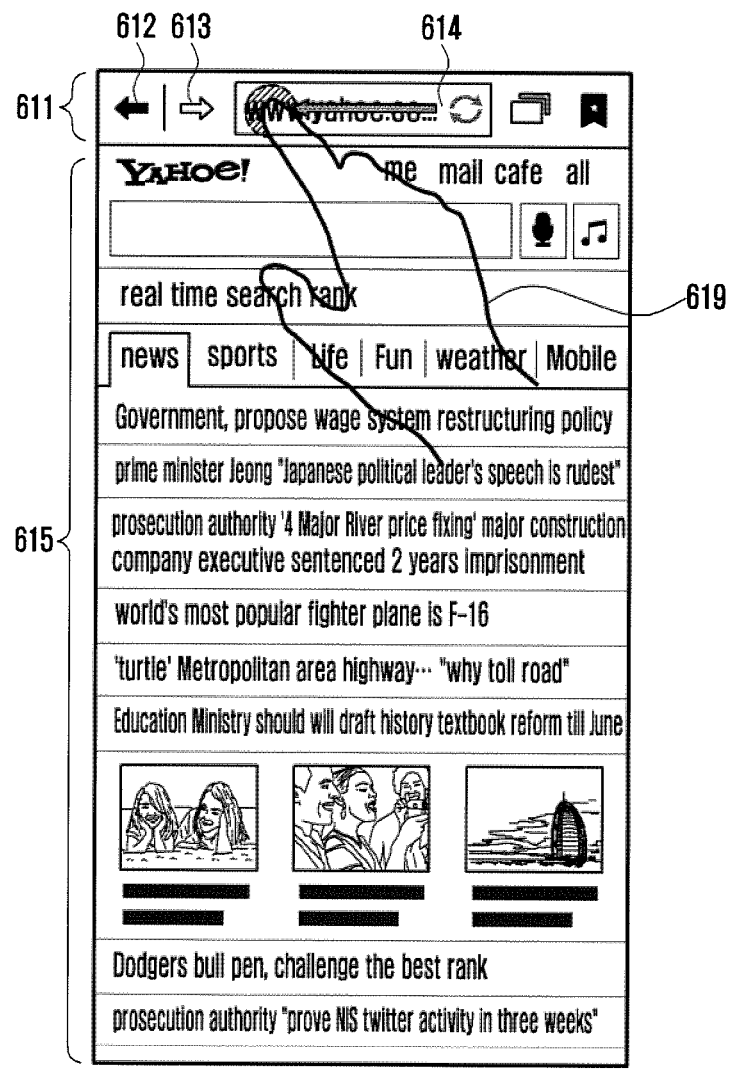
FIGS. 6A through 6C are diagrams illustrating exemplary screen displays for explaining a webpage navigation procedure according to another embodiment of the present disclosure.
Figure 6B:
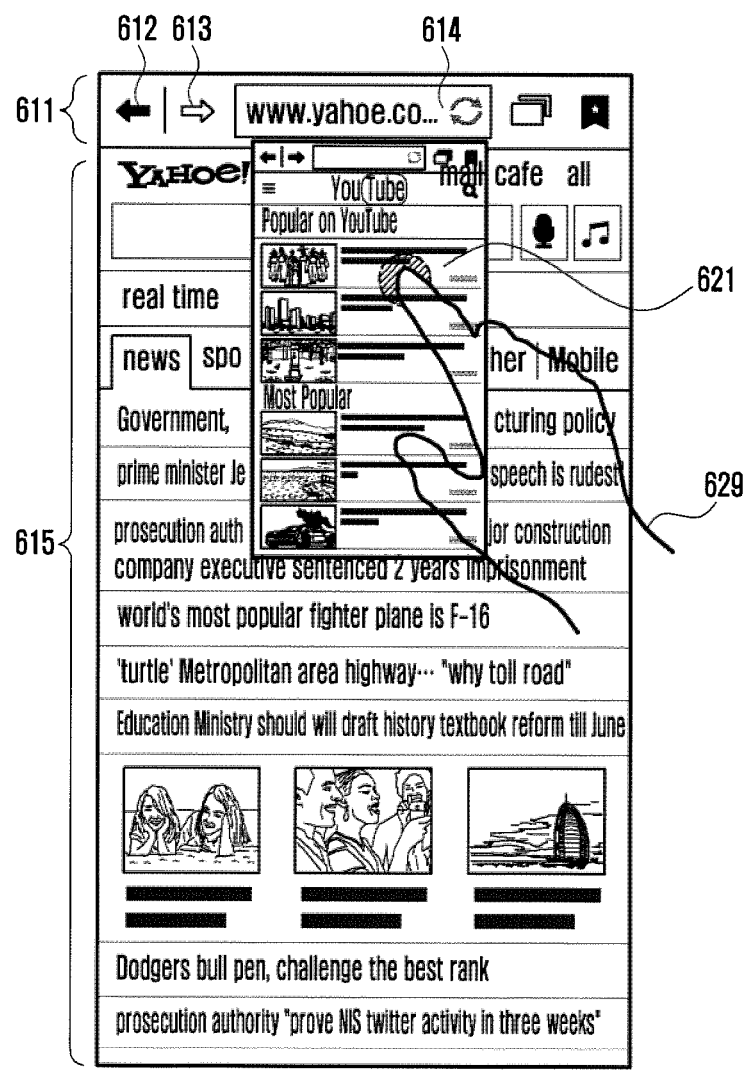
Figure 6C:
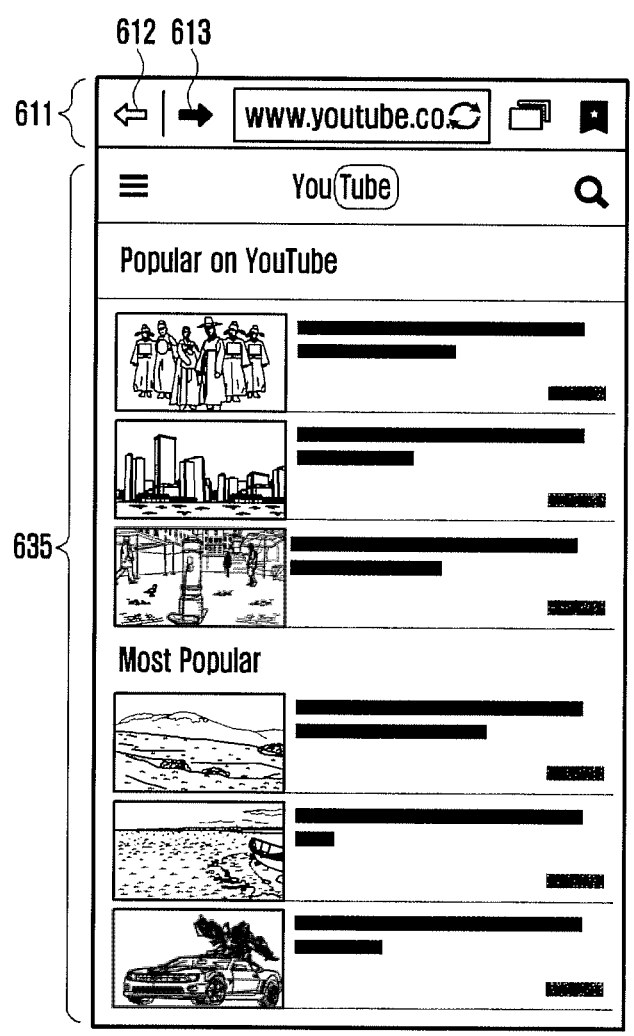

FIGS. 6A through 6C are diagrams illustrating exemplary screen displays for explaining a webpage navigation procedure according to another embodiment of the present disclosure;

Referring to FIG. 6A, the control unit 200 loads the first webpage 615 on the screen among a plurality of webpages. In this case, the forward button 613 of the web browser menu 611 can be displayed in the activated state.

The control unit 200 can receive a user input made as denoted by reference number 619 in the course of displaying the first webpage 615. For example, the control unit 200 can detect a user's flick gesture or touch and drag gesture made in a direction (e.g. left direction) on the web browser menu 611 (particularly, address window 614) as denoted by reference number 619.

Referring to FIG. 6B, the control unit 200 can display an object 621 pertaining to the second webpage that was displayed on the screen right after the first webpage 615 among the plural webpages. The object 621 pertaining to the second webpage can be a thumbnail image of the second webpage. The thumbnail image 621 of the second webpage can be displayed on the first web page 615 in an overlay manner.

The control unit 200 can receive a user input in the course of displaying the thumbnail image 621 of the webpage. For example, the control unit 200 can detect a user's tap gesture 629 on the thumbnail image 621 of the second webpage.

Referring to FIG. 6C, the control unit 200 can load the second webpage 635 that was displayed right after the first webpage 615 among the plural webpages in response to the user input made as denoted by reference number 629.

Figure 7A:
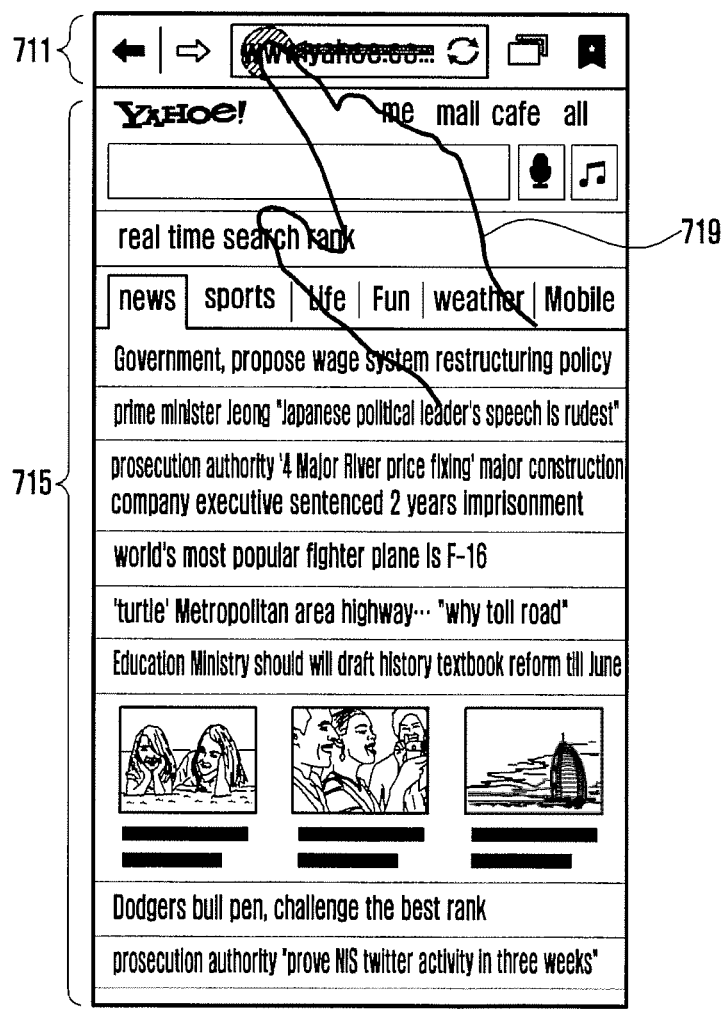
FIGS. 7A and 7B are diagrams illustrating exemplary screen displays for explaining a procedure of displaying an object pertaining to a webpage according to an embodiment of the present disclosure.
Figure 7B:
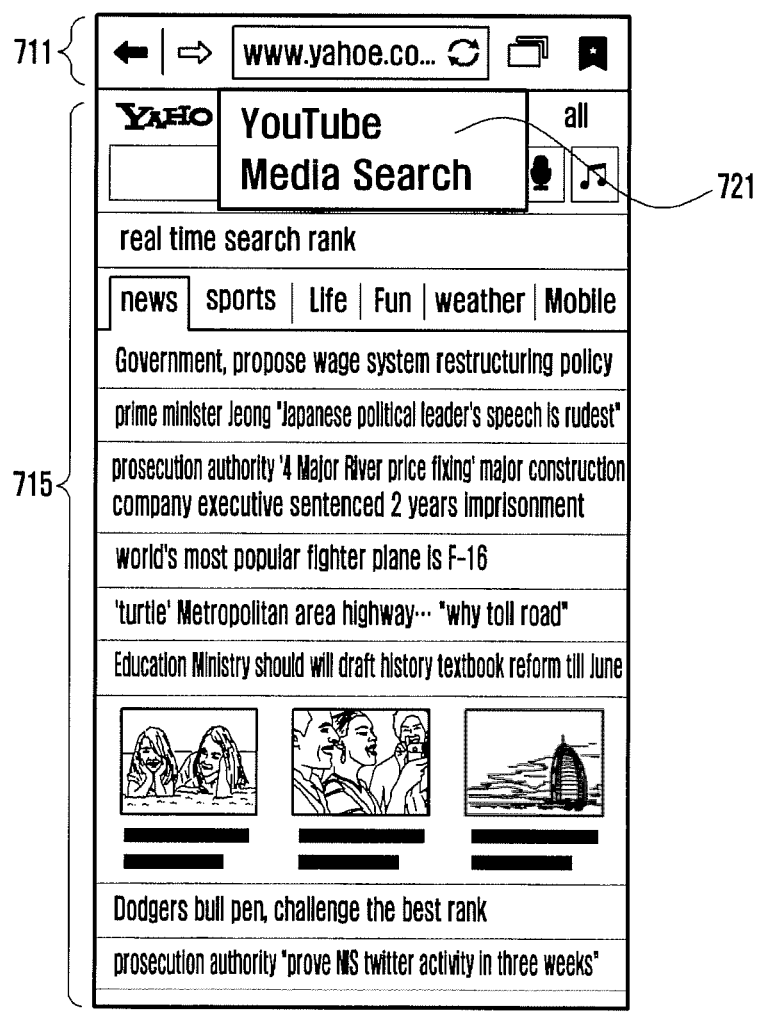

FIGS. 7A and 7B are diagrams illustrating exemplary screen displays for explaining a procedure of displaying an object pertaining to a webpage according to an embodiment of the present disclosure.

Referring to FIG. 7A, the control unit 200 loads the first web page 715 among a plurality of webpages. The control unit 200 receives a user input made as denoted by reference number 719 in the course of displaying the first webpage 715. For example, the control unit 200 can detect a user's flick gesture or touch and drag gesture made in a direction (e.g. left direction) on the web browser menu 711.

Referring to FIG. 7B, the control unit 200 displays an object 721 pertaining the second webpage that was displayed on the screen right after the first webpage 715 among the plural webpages in response to the user input made as denoted by reference number 719. The object 721 pertaining to the second webpage can be the title of the second webpage. The control unit 200 can acquire the title 721 of the second webpage in the course of loading the second webpage. The control unit 200 also can request the web server for the title of the second webpage.

Figure 8A:
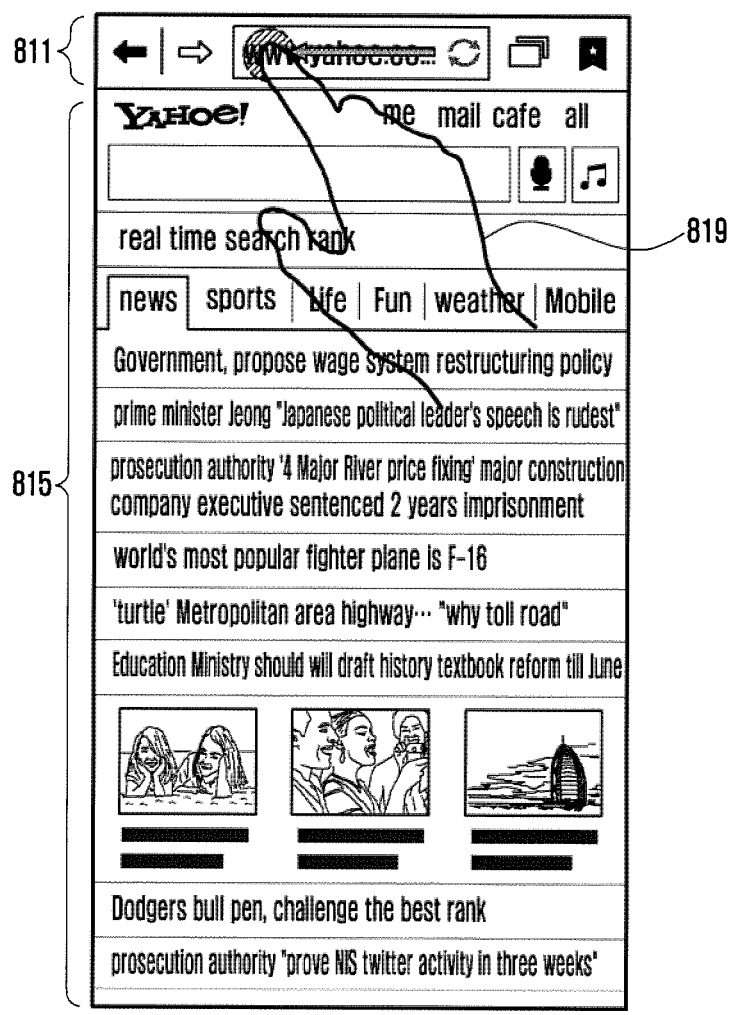
FIGS. 8A and 8B are diagrams illustrating exemplary screen displays for explaining a procedure of displaying an object pertaining to a webpage according to an embodiment of the present disclosure.
Figure 8B:
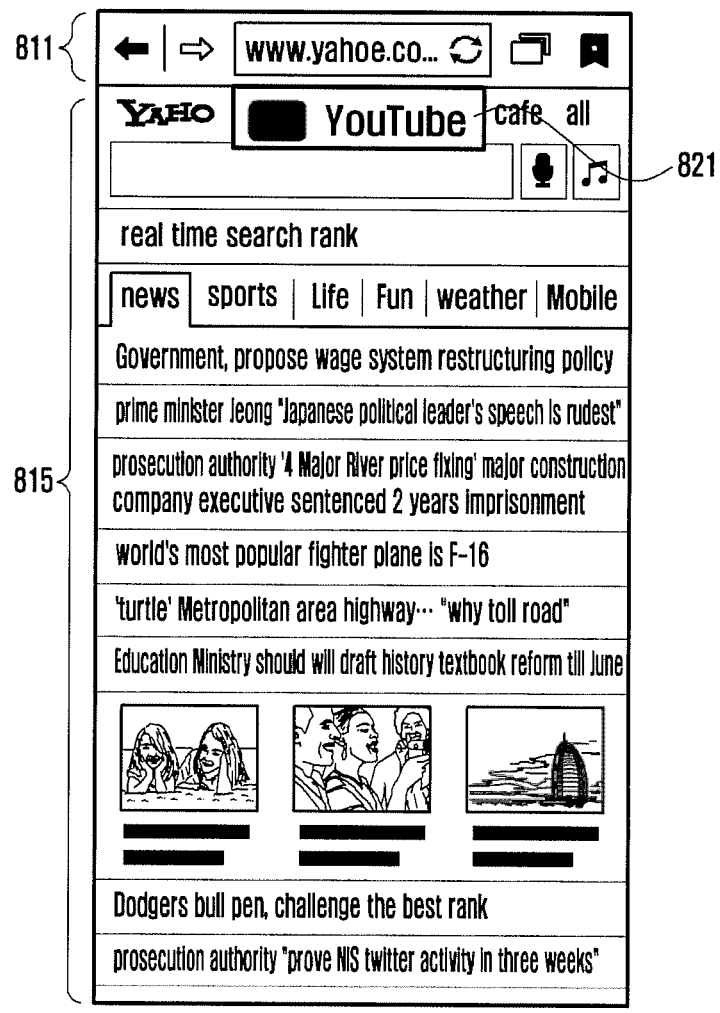

FIGS. 8A and 8B are diagrams illustrating exemplary screen displays for explaining a procedure of displaying an object pertaining to a webpage according to an embodiment of the present disclosure.

Referring to FIG. 8A, the control unit 200 can load the first webpage 815 on the screen among a plurality of webpages. The control unit 200 can receive a user input made as denoted by reference number 819 in the course of displaying the first webpage 815. For example, the control unit 200 can detect a user's flick gesture or touch and drag gesture made in a direction (e.g. left direction) on the web browser menu 811 as denoted by reference number 819.

Referring to FIG. 8B, the control unit 200 can display an object 821 pertaining to the second webpage that was displayed on the screen right after the first webpage 815 among the plural webpages in response to the user input made as denoted by reference number 819. The object 821 pertaining to the second webpage can be a favicon of the second webpage as a log image of the second webpage. The control unit 200 can acquire the favicon 821 of the second webpage in the course of loading the second webpage. The control unit 200 can request the web server providing the second webpage for the favicon 821 of the second webpage.

FIGS. 9A through 9D are diagrams illustrating exemplary screen displays for explaining a webpage navigation procedure according to another embodiment of the present disclosure.

Figure 9A:
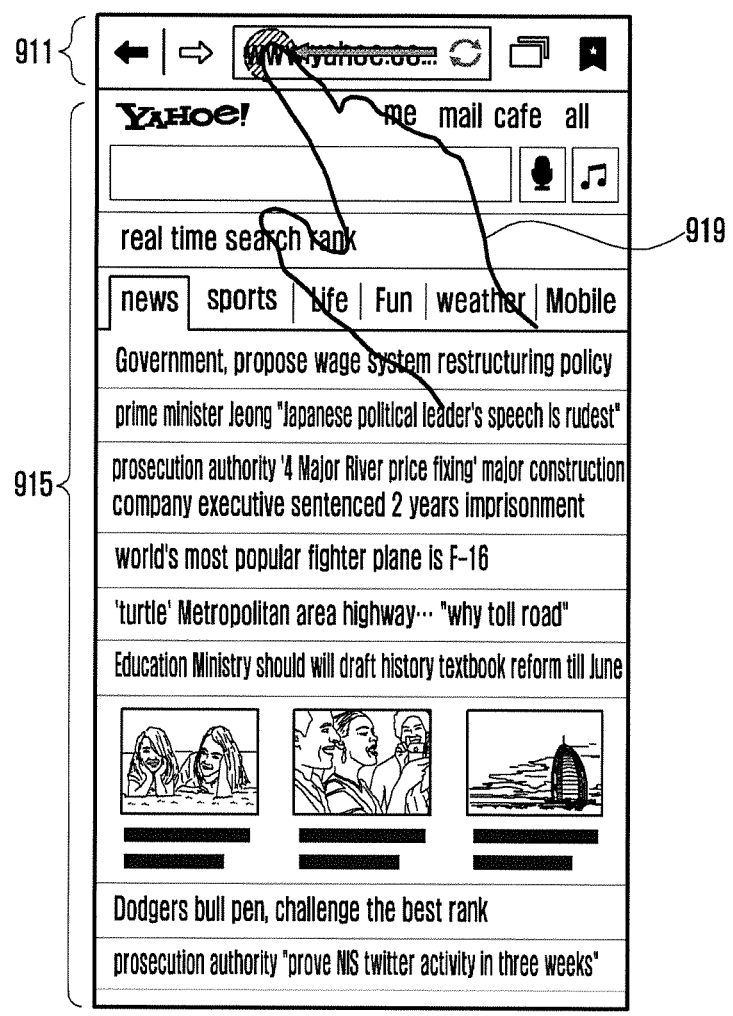
FIGS. 9A through 9D are diagrams illustrating exemplary screen displays for explaining a webpage navigation procedure according to another embodiment of the present disclosure.

Referring to FIG. 9A, the control unit 200 can display the first webpage 915 among a plurality of webpages.

The control unit 200 can receive a user input made as denoted by reference number 919 in the course of displaying the first webpage 915. For example, the control unit 200 can detect a user's flick gesture or touch and drag gesture made in a direction (e.g. left direction) on the web browser menu 911 as denoted by reference number 919.

Figure 9B:
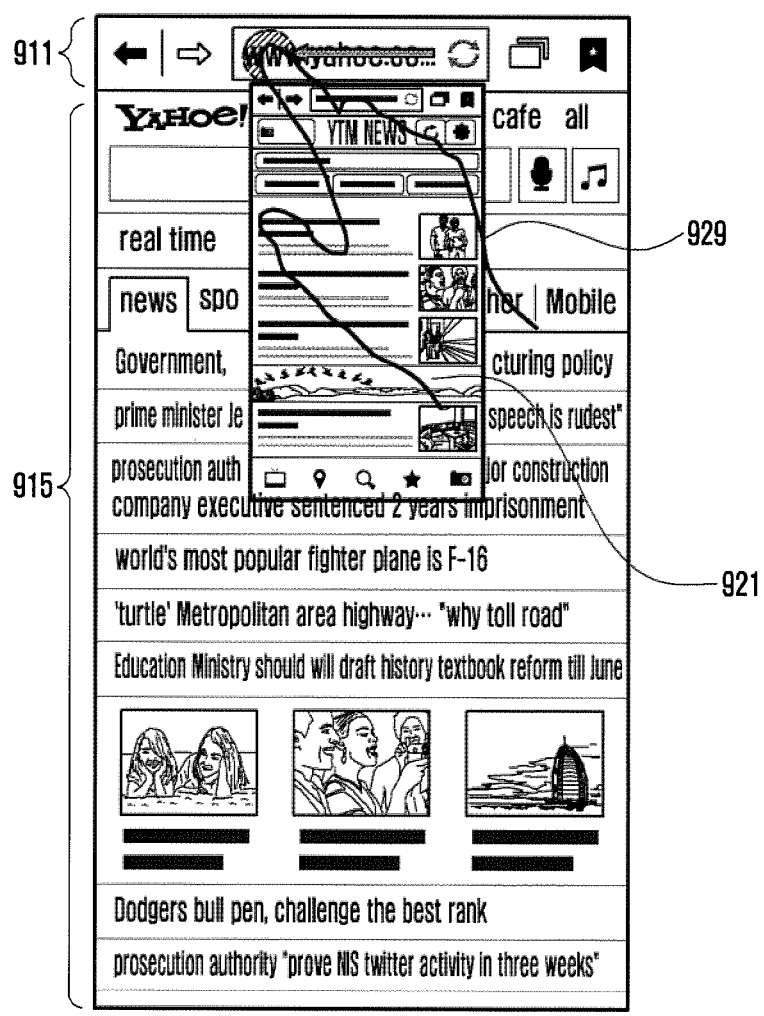

Referring to FIG. 9B, the control unit 200 can display an object 921 pertaining to the second webpage that was displayed on the screen right after the first webpage 915 among the plural webpages.

The control unit 200 can receive a user input made as denoted by reference number 929 in the course of displaying the second webpage. For example, the control unit 200 can detect a user's flick gesture or touch and drag gesture made in a direction (e.g. left direction) on the web browser menu 911 as denoted by reference number 929.

Figure 9C:
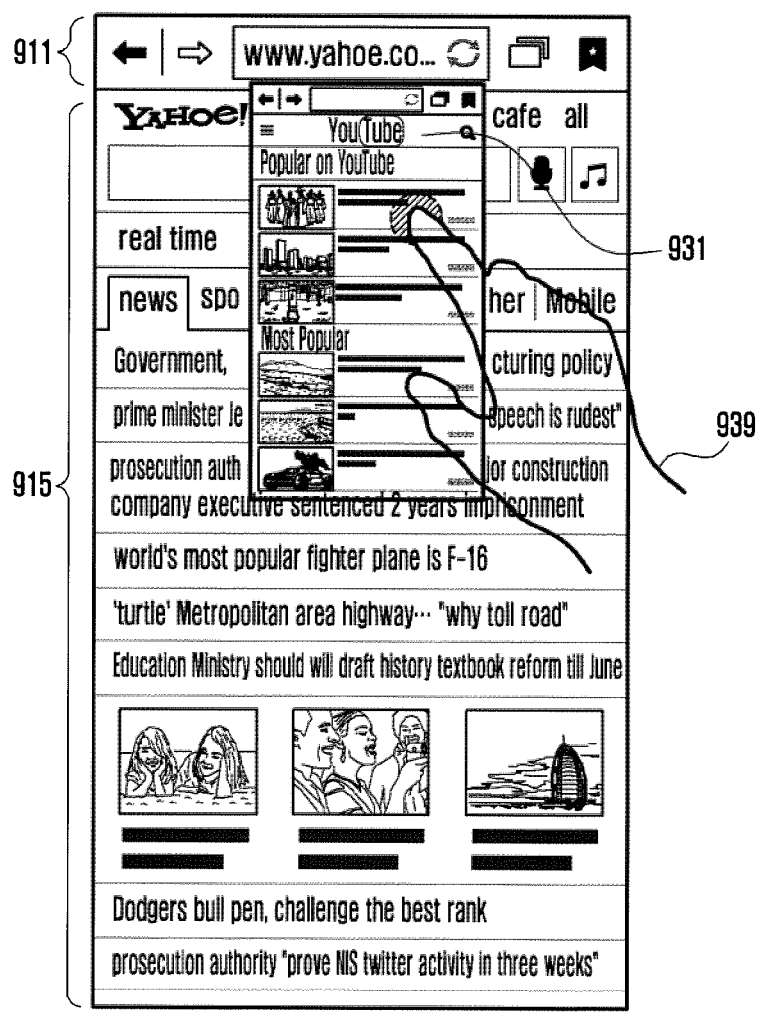

Referring to FIG. 9C, the control unit 200 can display an object 931 pertaining to the third webpage that was displayed on the screen right after the second webpage among the plural webpages without displaying the second webpage (e.g. in the state of maintaining the first webpage on the screen without navigating to the second webpage) in response to the user input made as denoted by reference number 929. If the flick or touch and drag gesture is made in a direction repeatedly on the web browser menu 911, the control unit 200 can display the object pertaining to the webpage that was loaded before or after the currently displayed webpage repeatedly other than navigating to the corresponding webpages.

The control unit 200 can receive a user input in the course of displaying the object 931 pertaining to the third webpage. For example, the control unit 200 can detects a user's tab gesture made as denoted by reference number 939 on the object 931 of the third webpage.

Figure 9D:
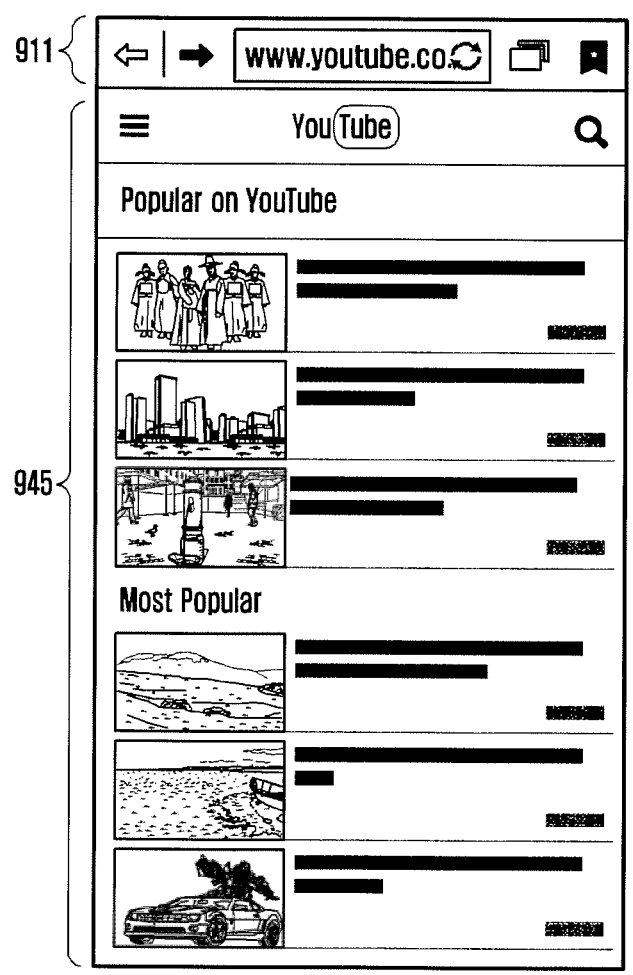

Referring to FIG. 9D, the control unit 200 can display the third webpage 945 which has been displayed on the screen after the second webpage among the plural webpages in response to the user input made as denoted by reference number 939.

Figure 10A:
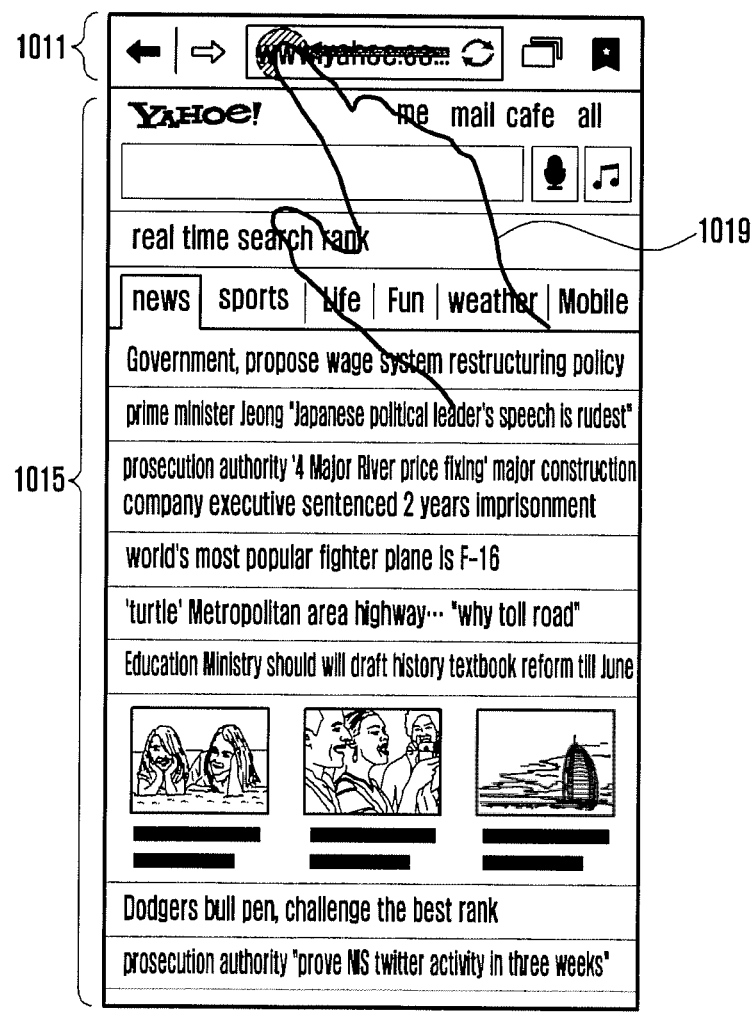
FIGS. 10A through 10D are diagrams illustrating exemplary screen displays for explaining a webpage navigation procedure according to another embodiment of the present disclosure.

FIGS. 10A through 10D are diagrams illustrating exemplary screen displays for explaining a webpage navigation procedure according to another embodiment of the present disclosure. Referring to FIG. 10A, the control unit 200 can display the first webpage 1015 on the screen among a plurality of webpages.

The control unit can receive a user input made as denoted by reference number 1019 in the course of displaying the first webpage 1015. For example, the control unit 200 can detect a flick gesture or touch and drag gesture made in a direction (e.g. left direction) on the web browser menu 1011.

Figure 10B:
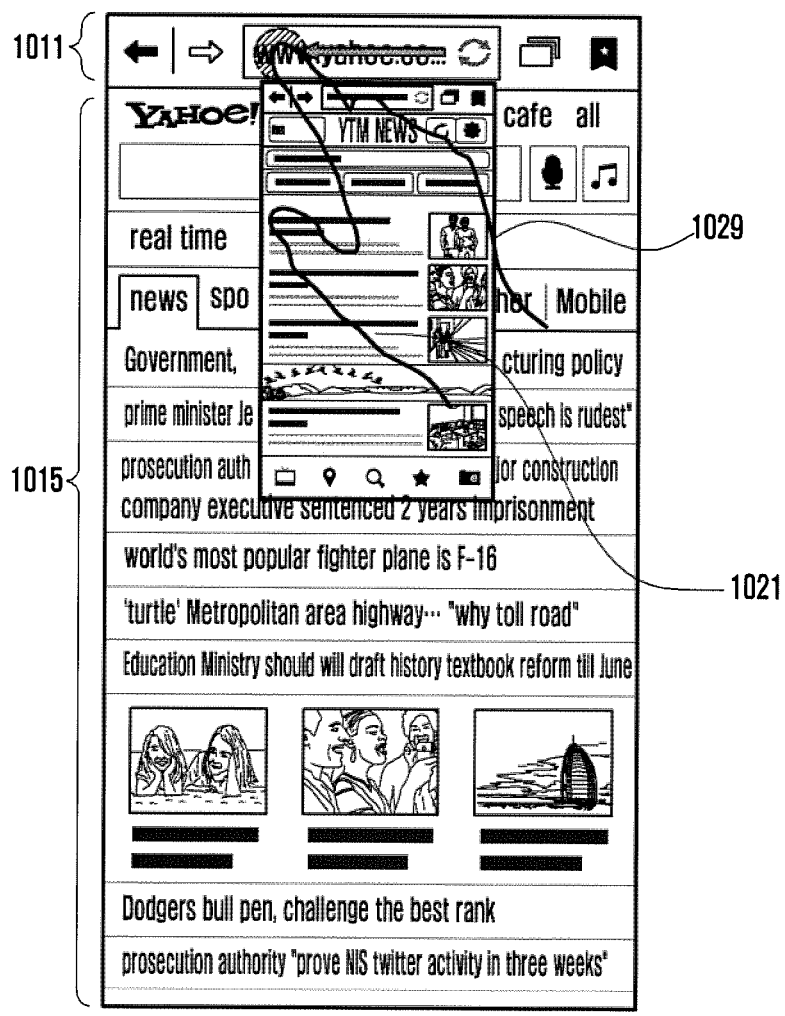

Referring to FIG. 10B, the control unit 200 can display an object 1021 pertaining to the second webpage that was displayed right after the first webpage 1015 among the plural webpages in response to the user input made as denoted by reference number 1019.

The control unit 200 can receive a user input 1029 in the course of displaying the object 1021 of the second webpage. For example, the control unit 200 can detect the user's flick gesture or touch and drag gesture made again in the same direction (e.g. left direction) on the web browser menu 1011 as denoted by reference number 1029.

Figure 10C:
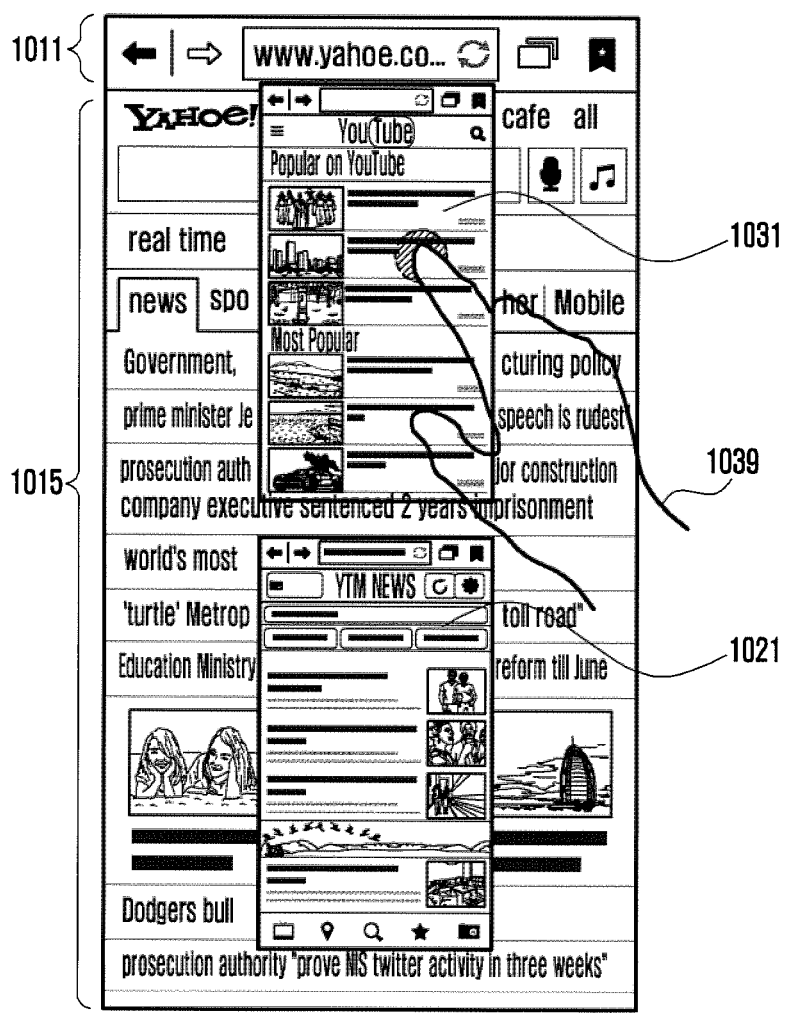

Referring to FIG. 10C, the control unit can display an object 1031 pertaining to the third webpage that was displayed right after the second webpage among the plural webpages without displaying the second webpage in response to the user input made as denoted by reference number 1029. In this case, the object 1031 pertaining to the third webpage can be displayed along with the object 1021 of the second webpage. For example, the object 1031 of the third webpage and the object 1021 of the second webpage are arranged vertically. Also, the object 1031 of the third webpage and the object 1021 of the second webpage can be arranged horizontally. The object 1031 of the third webpage and the object 1021 of the second webpage can be arranged in various manners. If the number of objects increases as the user input repeats, part of the objects of the webpages can be out of the screen. Also, as the number of objects increases, the objects can be reduced in size to be displayed together on the screen.

The user can select one of the objects 1021 and 1031 to display the webpage including the selected object. For example, the control unit 200 can detect a user's tap gesture made as denoted by reference number 1039 on the object 1031 of the third webpage. If the number of objects increases as the user input repeats, the user can make a scroll gesture to display the objects hidden out of screen and select one of the objects displayed on the screen.

Figure 10D:
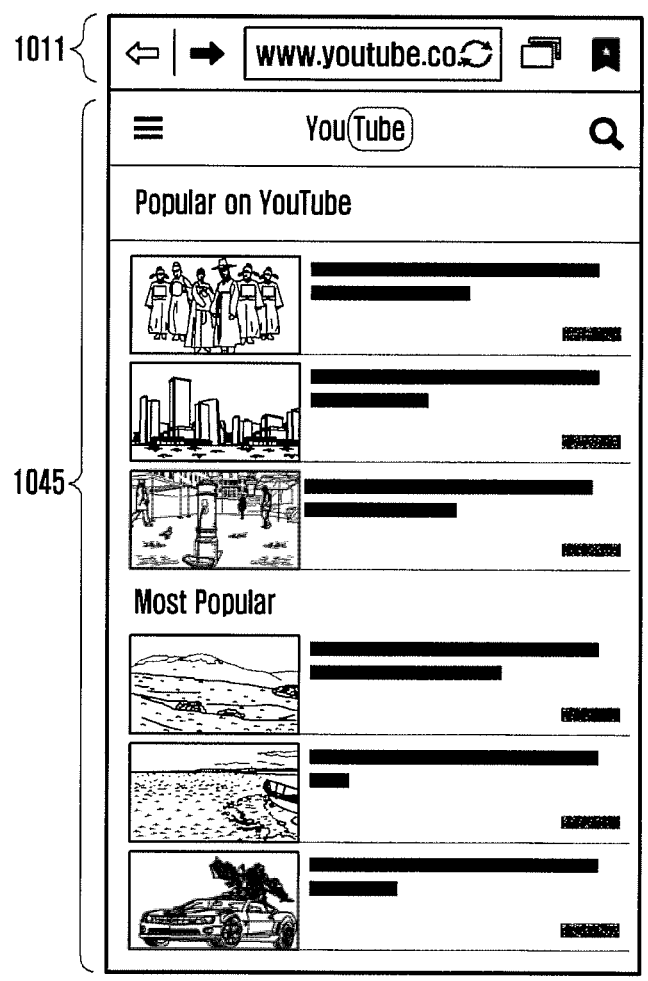

Referring to FIG. 10D, the control unit can display the third webpage 1045 that was displayed after the second webpage among the plural webpages in response to the user input made as denoted by reference number 1039.

FIGS. 11A through 11D are diagrams illustrating exemplary screen displays for explaining a webpage navigation procedure according to another embodiment of the present disclosure.

Figure 11A:
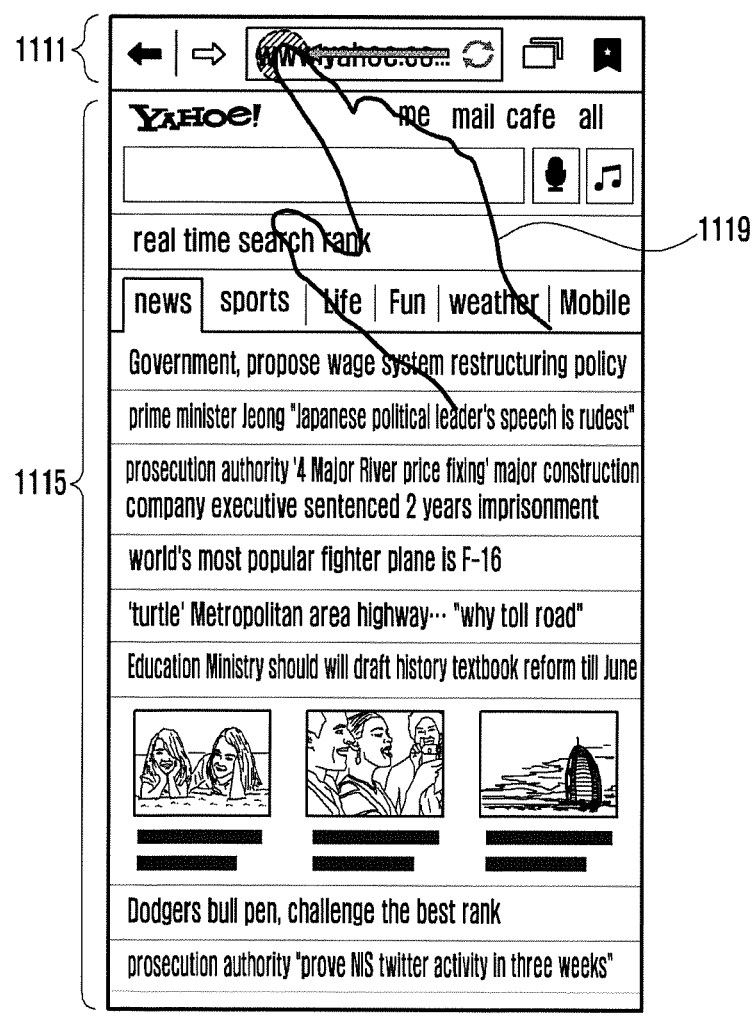
FIGS. 11A through 11D are diagrams illustrating exemplary screen displays for explaining a webpage navigation procedure according to another embodiment of the present disclosure.

Referring to FIG. 11A, the control unit 200 can display the first webpage 1115 on the screen among a plurality of webpages.

The control unit 200 can receive a user input made as denoted by reference number 1119 in the course of displaying the first webpage 1115. For example, the control unit 200 can detects a user's flick gesture or touch and drag gesture made in a direction (e.g. left direction) on the web browser menu 1111 as denoted by reference number 1119.

Figure 11B:
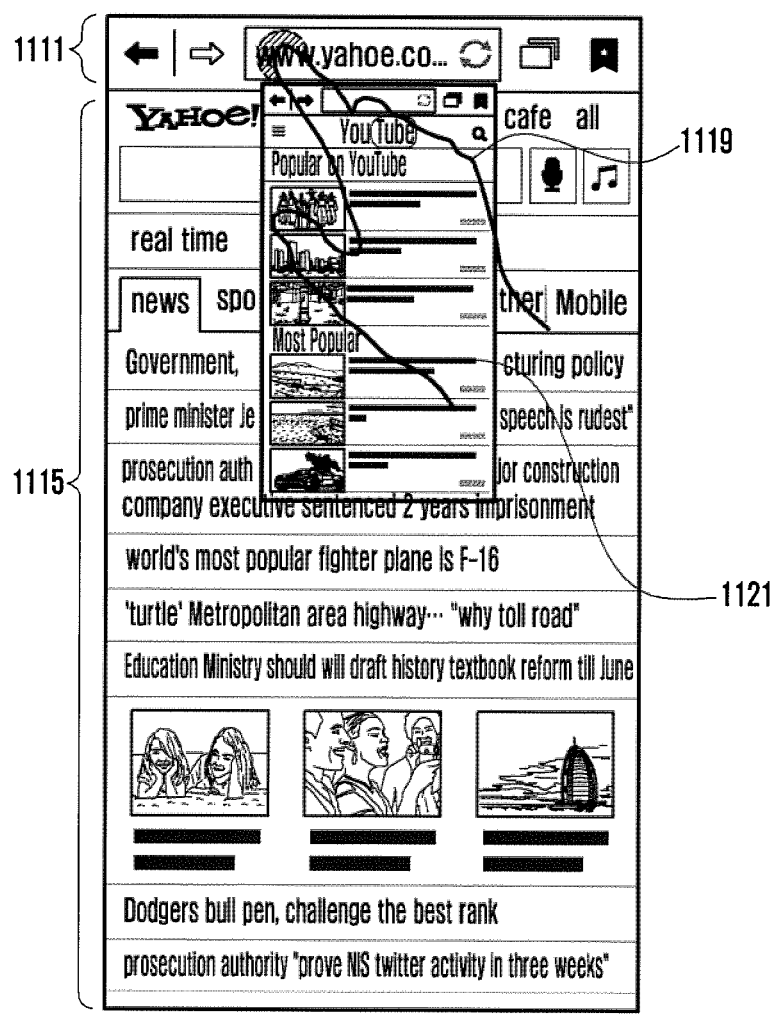

Referring to FIG. 11B, the control unit 200 can display an object 1121 pertaining to the second webpage that was displayed on the screen right after the first webpage 1115 among the plural webpages in response to the user input made as denoted by reference number 1119. The user can maintain the touch on the web browser menu 1111 after the flick gesture or touch and drag gesture. While the user maintains the touch, the control unit 200 displays the object 1121 pertaining to the second webpage on the screen constantly.

Figure 11C:
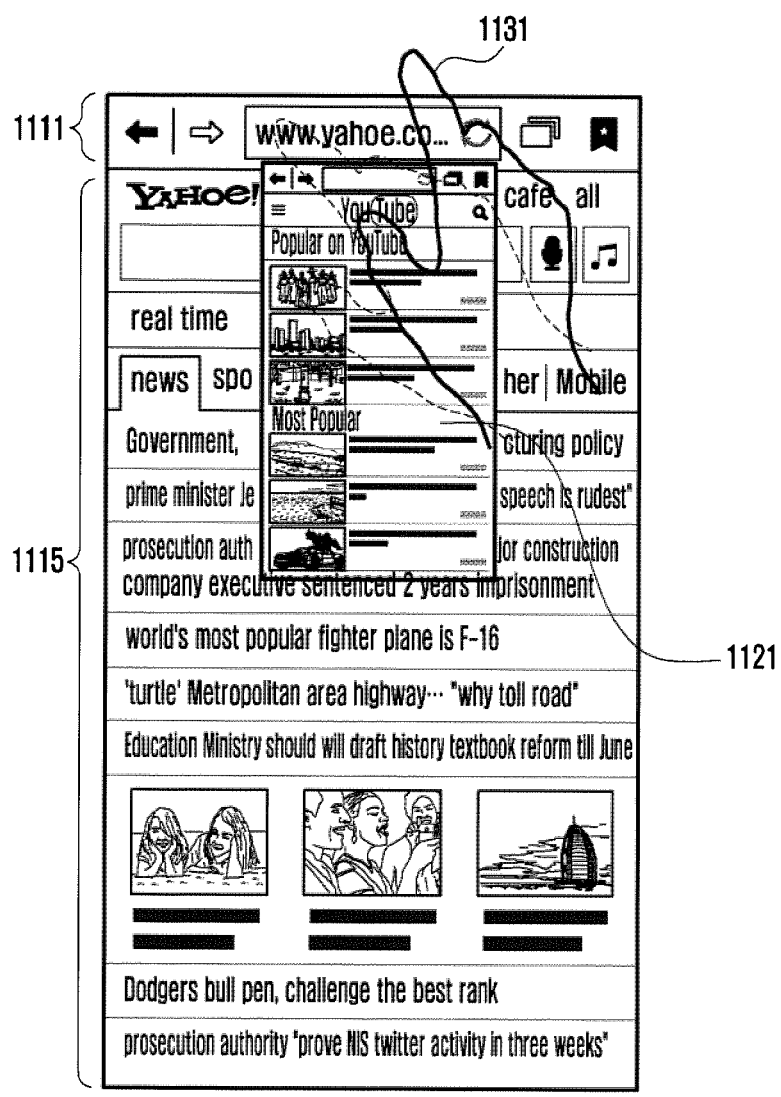

Referring to FIG. 11C, the control unit 200 can receive a user input made as denoted by reference number 1131 in the course of displaying the object 1121 of the second webpage. For example, the control unit 200 can detect a user's touch release gesture made as denoted by reference number 1131 after the touch the flick gesture or touch and drag gesture.

Figure 11D:
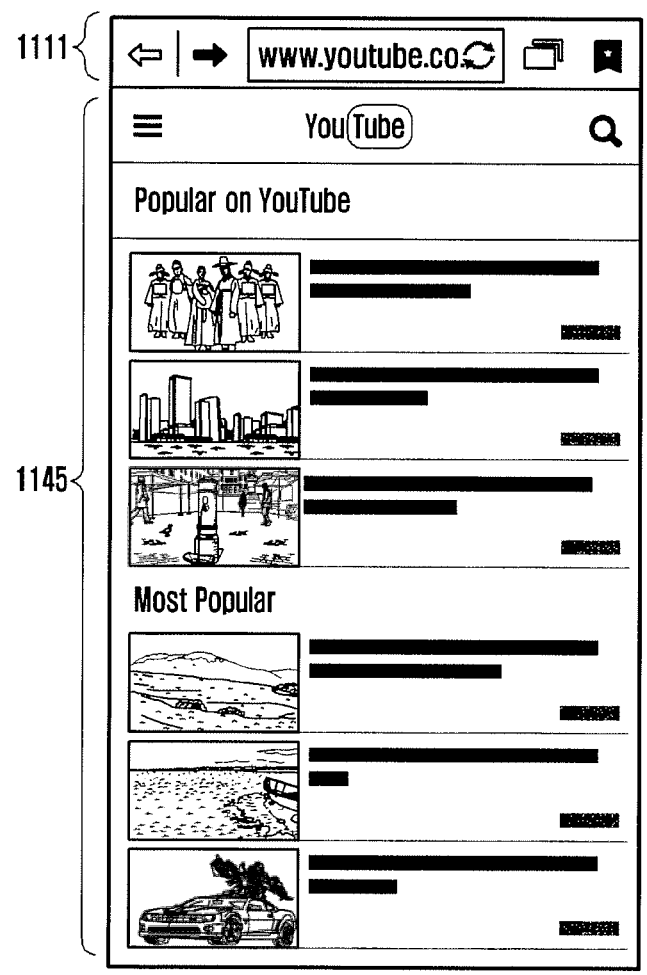

Referring to part FIG. 11D, the control unit 200 can display the second webpage 1145 that was displayed right after the first webpage among the plural webpages in response to the user input made as denoted by reference number 1131.

FIGS. 12A through 12D are diagrams illustrating exemplary screen displays for explaining a webpage navigation procedure according to another embodiment of the present disclosure.

Figure 12A:
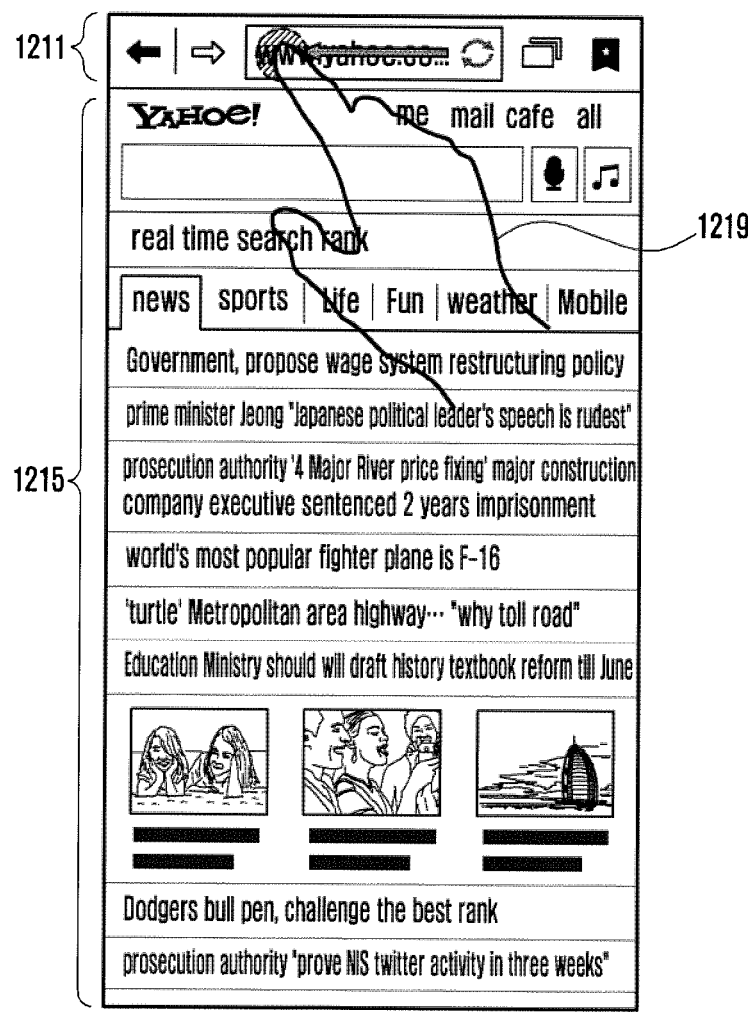
FIGS. 12A through 12D are diagrams illustrating exemplary screen displays for explaining a webpage navigation procedure according to another embodiment of the present disclosure.

Referring to FIG. 12A, the control unit 200 can display the first webpage 1215 among a plurality of webpages. The control unit 200 can receive a user input made as denoted by reference number 1219 in the course of the first webpage 1215. For example, the control unit 200 can detect a user's flick gesture or touch and drag gesture made in a direction (e.g. left direction) on the web browser menu 1211 as denoted by reference number 1219.

Figure 12B:
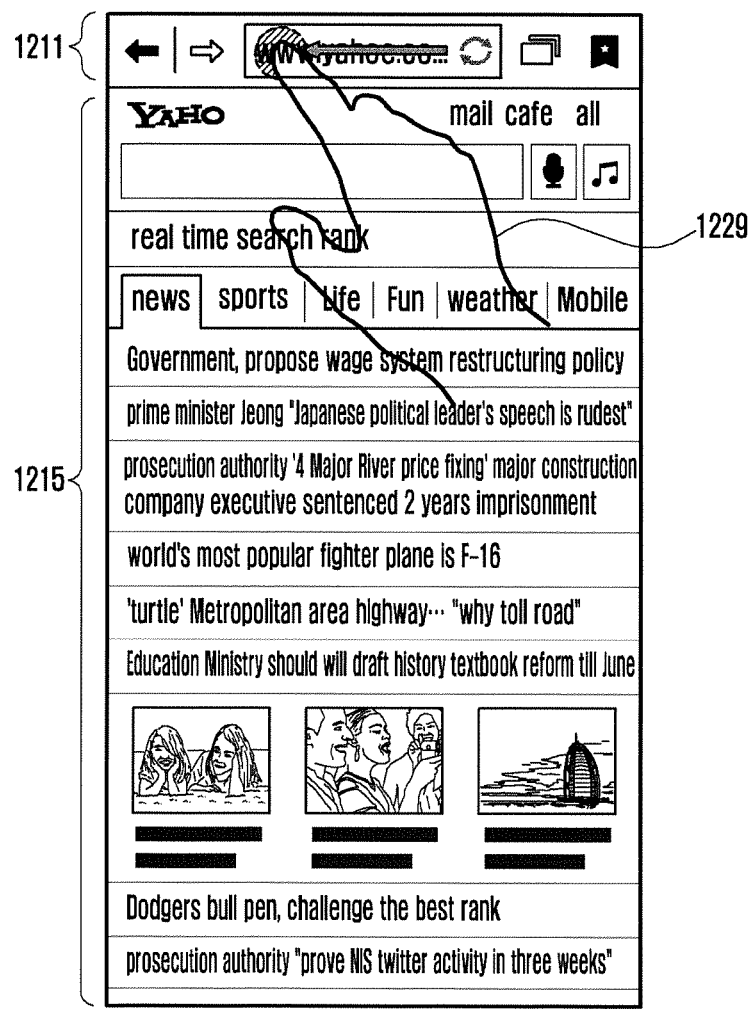

Referring to FIG. 12B, the control unit 200 can receive an additional user input made as denoted by reference number 1229 in a predetermined time duration in the state where the first webpage is displayed on the screen. For example, the control unit 200 can detect the user's flick gesture or touch and drag gesture in a direction (e.g. left direction) on the web browser menu 1211 in about 0.5~1 second. The control unit 200 can detect the additional user input made as denoted by reference number 1229 since the detection of the user input made as denoted by reference number 1219 on the web browser menu 1211. In this case, the control unit 200 can skip displaying the object pertaining to the second webpage.

Figure 12C:
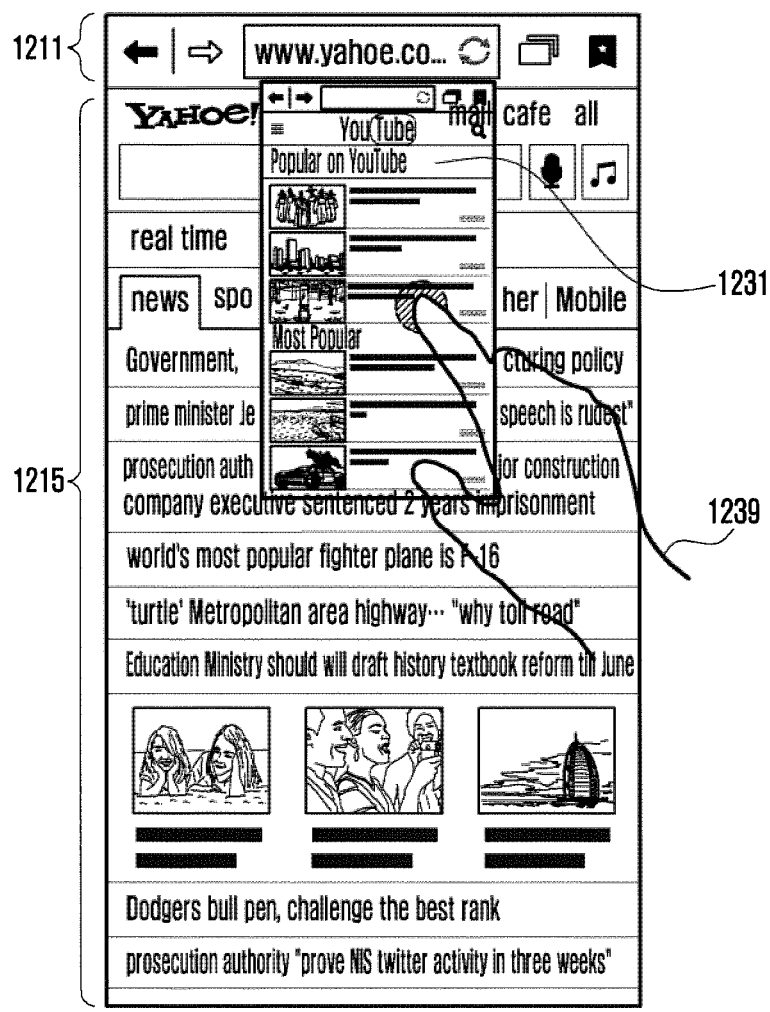

Referring to FIG. 12C, if there is no further user input in a predetermined time after the detection of the additional user input made as denoted by reference number 1229, the control unit 200 can display the object 1231 pertaining to the third webpage that was displayed on the screen secondly after the second webpage among the plural web pages.

The control unit 200 can receive a user input in the course of displaying the object 1231 of the third webpage. For example, the control unit 200 can detect a user's tap gesture made on the object 1231 of the third webpage as denoted by reference number 1239.

Figure 12D:
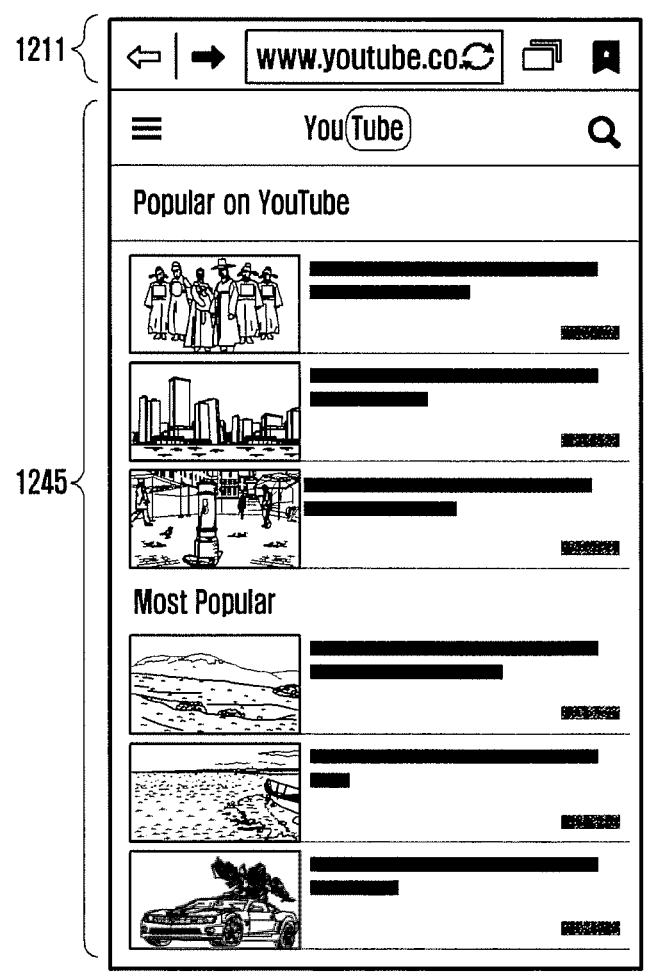

Referring to part FIG. 12D, the control unit 200 can display the third webpage 1245 that was loaded on the screen after the second webpage among the plural webpages in response to the user input made as denoted by reference number 1239.

FIG. 13 is a flowchart illustrating a webpage navigation method according to an embodiment of the present disclosure.

Referring to FIG. 13, the mobile terminal 100 displays a plurality of webpages successively in the order of the user inputs at step S1301. The mobile terminal 100 displays the first webpage among the plural webpages at step S1303. The mobile terminal 100 receives a first user input in the course of displaying the first webpage at step S1305. For example, the mobile terminal 100 can detect a first user input gesture on the web browser menu. The mobile terminal 100 determines whether the first user input gesture is made in a first direction or a second direction at step S1307. For example, the mobile terminal 100 can determine whether the first user input gesture is a right direction flick gesture or a left direction flick gesture.

If the first user input gesture is made in the first direction, the mobile terminal displays an object pertaining to the second webpage on the screen among the plural webpages at step S1309. The mobile terminal receives a second user input in the course of displaying the object pertaining to the second webpage at step S1311. The mobile terminal 100 displays the second webpage that was displayed right before the first webpage on the screen in response to the second user input at step S1313.

If the first user input gesture is made in the second direction, the mobile terminal 100 displays an object pertaining to the third webpage on the screen among the plural webpages at step S1315. The mobile terminal 100 receives the second user input in the course of displaying the object pertaining to the third webpage at step S1317. The mobile terminal 100 displays the third webpage that was displayed after the first webpage on the screen in response to the second user input at step S1319.

Figure 14:
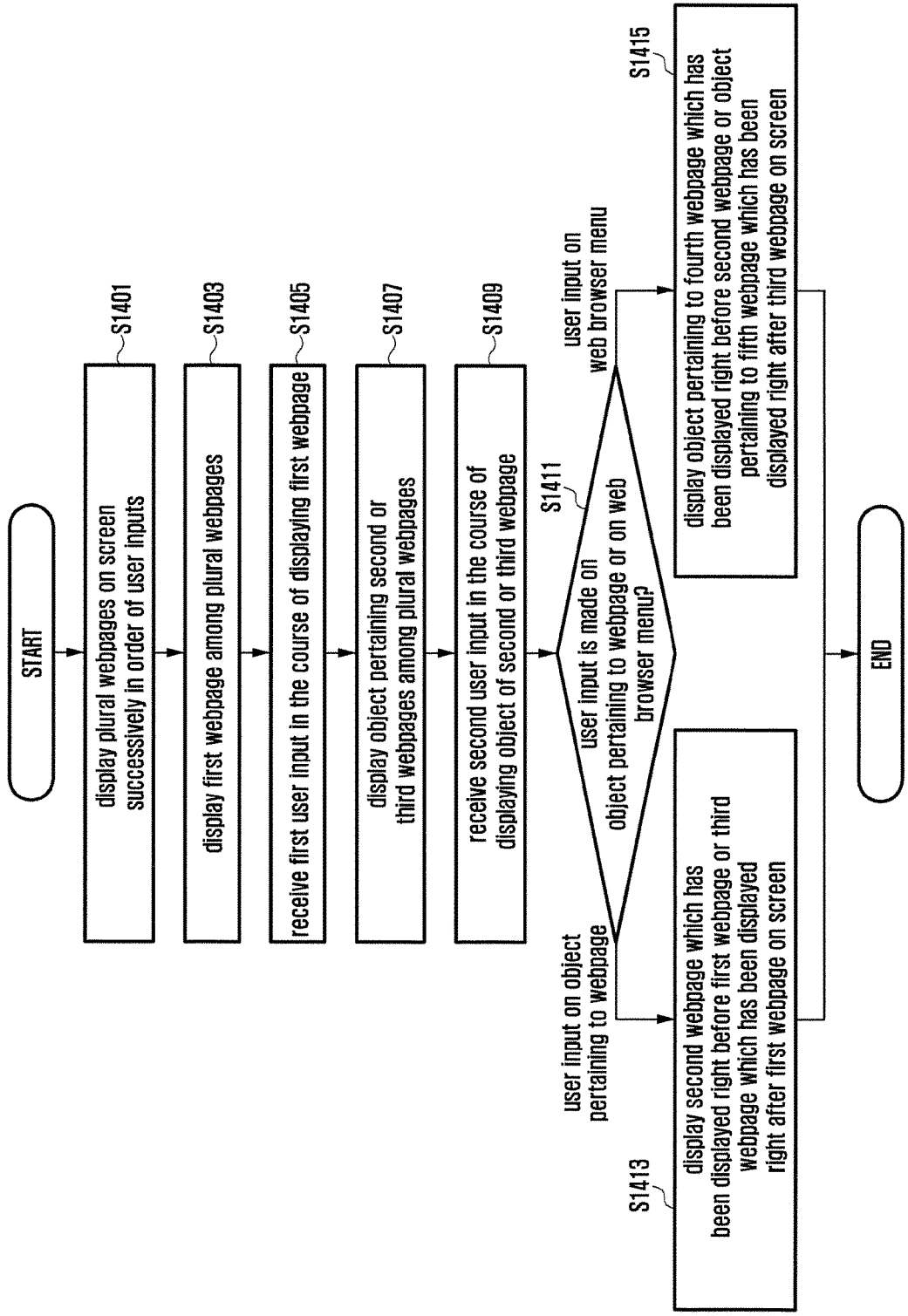
FIG. 14 is a flowchart illustrating a webpage navigation method according to another embodiment of the present disclosure.

FIG. 14 is a flowchart illustrating a webpage navigation method according to another embodiment of the present disclosure.

Referring to FIG. 14, the mobile terminal displays a plurality of webpages successively in the order of the user inputs at step S1401. The mobile terminal 100 displays the first webpage among the plural webpages at step S1403. The mobile terminal 100 receives a first user input in the course of displaying the first webpage at step S1405. For example, the mobile terminal 100 can detect a first user input gesture on the web browser menu. The mobile terminal 100 displays an object pertaining to the second or third webpage on the screen among the plurality webpages in response to the first user input at step S1407. The mobile terminal receives a second user input in the course of displaying the object of the second or third webpage at step S1409. The mobile terminal determines whether the second user input is made on the object displayed on the screen or the web browser menu at step S1411.

If the second user input is made on the object displayed on the screen, the mobile terminal 100 displays the second webpage that was displayed right before the first webpage or the third webpage that was displayed right after the first webpage on the screen at step S1413.

If the second user input is made on the web browser menu, the mobile terminal displays an object of the fourth webpage that was displayed right before the second webpage or an object of the fifth webpage that was displayed right after the third webpage on the screen at step S1415.

Figure 15:
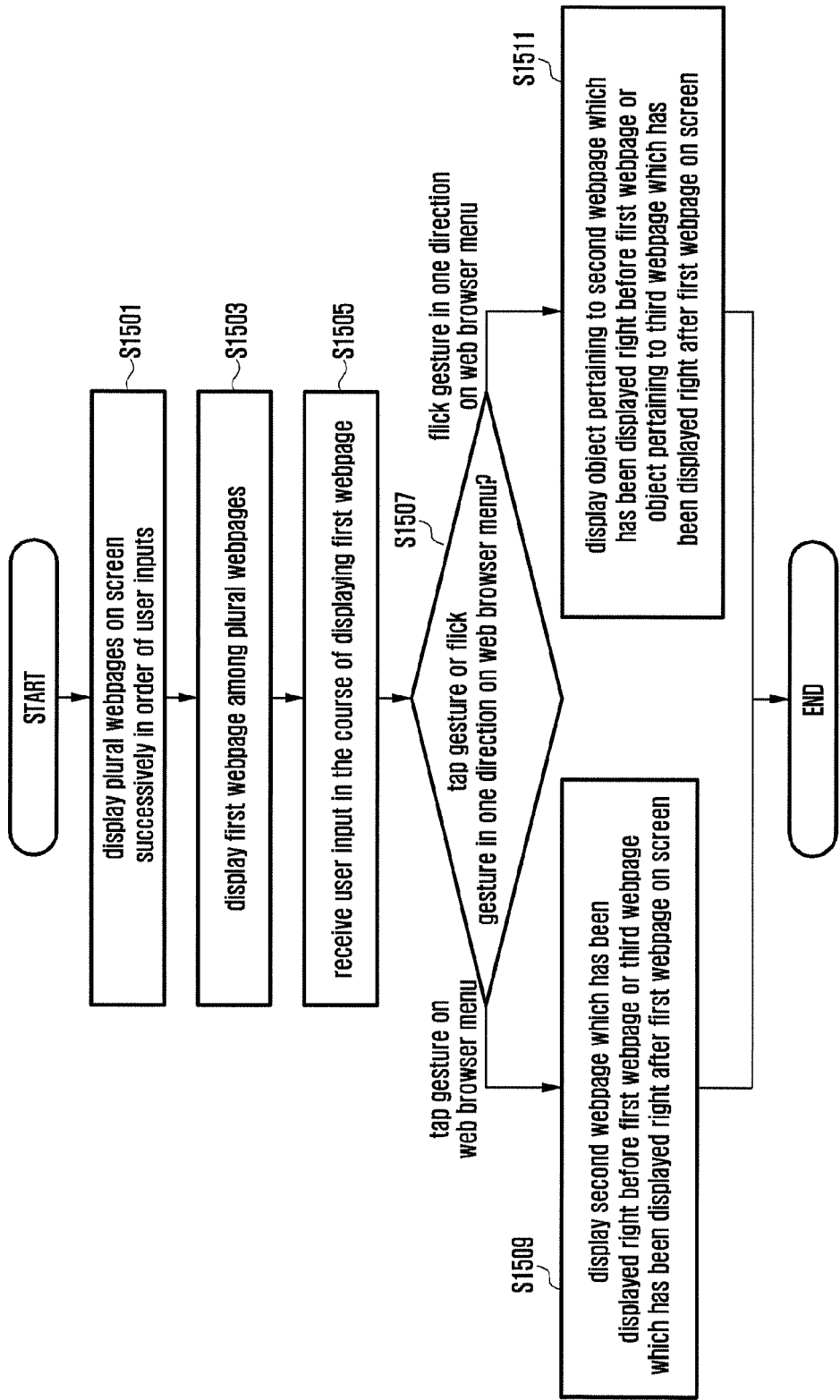
FIG. 15 is a flowchart illustrating a webpage navigation method according to an embodiment of the present disclosure.

FIG. 15 is a flowchart illustrating a webpage navigation method according to an embodiment of the present disclosure.

Referring to FIG. 15, the mobile terminal displays a plurality of webpages successively in the order of the user inputs at step S1501. The mobile terminal 100 displays the first webpage among the plural webpages at step S1503. The mobile terminal 100 detects a user input gesture in the course of displaying the first webpage at step S1505. The mobile terminal 100 determines whether the user input gesture is a tap gesture made on the web browser menu or a flick gesture made in a direction on the web browser menu at step S1507. For example, the mobile terminal 100 can determine whether the user input gesture is the tap gesture made to the backward or forward button on the web browser menu or the flick gesture made in right or left direction on the web browser menu.

If the user input gesture is the tap gesture on the web browser menu, the mobile terminal 100 displays the second webpage that was loaded right before the first webpage or the third webpage that was loaded right after the first webpage on the screen at step S1509.

If the user input gesture is the flick gesture made in a direction on the web browser menu, the mobile terminal 100 displays the object pertaining to the second web page that was displayed right before the first webpage or the object pertaining to the third webpage that was displayed right after the first webpage at step S1511.

Figure 16:
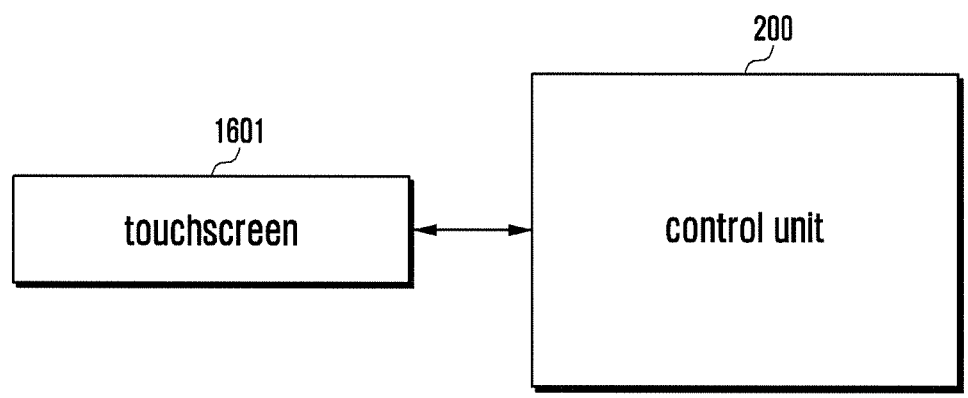
FIG. 16 is a schematic block diagram illustrating a configuration of the mobile terminal according to an embodiment of the present disclosure.

FIG. 16 is a schematic block diagram illustrating a configuration of the mobile terminal according to an embodiment of the present disclosure.

As shown in FIG. 16, the mobile terminal 100 includes a touchscreen 1601 and a control unit 200. Since the hardware configurations of the touchscreen 1601 and the control unit 200 have been described above, detailed descriptions thereof are omitted herein.

The control unit 200 displays a plurality of webpages on the touchscreen 1601 successively in the order of the user inputs. The control unit 200 displays the first webpage on the touchscreen 1601 among the plural webpages. The control unit 200 displays the object pertaining to the second or third webpages on the touchscreen 1601 in response to the first user input received in the course of displaying the first webpage. The control unit 200 displays the second webpage that was displayed right before the first webpage or the third webpage that was displayed right after the first webpage on the touchscreen 1601 in response to the second user input received in the course of displaying the object of the second or third webpage.

As described above, the webpage navigation method and apparatus of the present disclosure is advantageous in terms of loading the webpage that was displayed previously before or after the current webpage on the screen quickly. This makes it possible to reduce unnecessary webpages loading time and web data consumption.

Also, the webpage navigation method and apparatus of the present disclosure is advantageous in terms of allowing the user to determine whether to change the webpage intuitively by checking the objects associated with the webpage that are presented before loading the target webpage.

Also, the webpage navigation method and apparatus of the present disclosure is advantageous in terms of allowing for use of a new user input gesture (e.g. flick gesture) as well as the legacy user input gesture (e.g. tap gesture). This makes it possible for the user to navigate webpages one of the legacy and proposed webpage navigation methods selectively.

The above described embodiments of the present disclosure can be implemented in hardware, software, or a combination thereof. The webpage navigation methods according to the various embodiments can be stored in a computer-readable storage medium, which includes magnetic media such as a floppy disk and a magnetic tape, optical media including a Compact Disc (CD) ROM and a Digital Video Disc (DVD) ROM, a magneto-optical media such as the hardware device designed for storing and executing program commands such as ROM, RAM, and flash memory.

The webpage navigation method of the present disclosure can be implemented in a computer or a mobile terminal having a control unit and a memory which is a computer-readable storage media suitable for storing the program or programs including the instructions for implementing the embodiments of the present disclosure. Accordingly, the present disclosure includes the program including the codes for implementing the apparatus or method disclosed in a certain claim of the present specification and the machine (computer) readable storage media storing the program. Such program can be transferred through a medium such as a communication signal through a wired or wireless connection link, and the present disclosure include equivalents. The mobile terminal of the present disclosure may receive the program from a program provision apparatus connected through a wired or wireless link and store the received program. Also, the user may configure the settings of the mobile terminal to restrict the operations of the embodiments of the present disclosure to the inside of the mobile terminal or extend the operations to the interoperation with a server through a network.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A webpage navigation method for a mobile terminal, the method comprising:
   displaying a first webpage on a screen among a plurality of webpages loaded in order of user inputs;
   displaying a web browser menu of a web browser installed in the mobile terminal;
   receiving a first user input made on the screen, the first user input including one of a first gesture or a second gesture, the first user input made by one of flick gesture or a drag gesture made on a URL editor of the web browser menu;
   displaying an object pertaining to one of a second webpage loaded on the screen right before the first webpage in response to receiving the first gesture, or a third webpage loaded on the screen right after the first webpage, in response to receiving the second gesture, wherein only one of the objects pertaining to the second webpage or the third webpage is displayed at a given time;
   receiving a second user input for selecting the object pertaining to one of the second or third webpages; and
   re-displaying one of the second or third webpages according to the second user input,
   wherein there is no indication of the second or third webpage on the screen while displaying the first webpage.

2. The method of claim 1, wherein displaying the first webpage comprises executing the web browser installed in the mobile terminal to display the first webpage of the plurality of webpages, and wherein the re-displaying one of the second and third webpages comprises loading one of the second and third webpages in a state that the web browser is running.

3. The method of claim 1, wherein displaying the object comprises overlaying the object on at least part of the first webpage.

4. The method of claim 1, wherein the object is one of a thumbnail image, a title, or a favicon of a corresponding webpage.

5. The method of claim 1, wherein the web browser menu comprises a backward button to navigate to a webpage displayed right before the first webpage and a forward button to navigate to a webpage displayed right after the first webpage.

6. The method of claim 1, wherein the second user input is a touch release gesture made after the flick gesture or the drag gesture.

7. The method of claim 1, further comprising:
   receiving a third user input made onto the web browser menu in a state of displaying the object pertaining to one of the second or third webpages, the third user input including the first gesture or the second gesture; and
   displaying an object pertaining to one of a fourth webpage that was displayed right before the second webpage, in response to receiving the first gesture, or a fifth webpage that was displayed right after the third webpage among the plurality of webpages in response to the second gesture.

8. The method of claim 7, wherein the object pertaining to one of the fourth or fifth webpages is displayed along with the object pertaining to one of the second or third webpages.

9. The method of claim 7, further comprising:
   determining whether the third user input is received in a predetermined time duration after receiving the first user input; and
   skipping, when the third user input is received in the predetermined time duration, a display of the object pertaining to one of the second or third webpages, and displaying the object pertaining to one of the fourth or fifth webpages.

10. A mobile terminal for navigating webpages, the mobile terminal comprising:
    a touchscreen; and
    a controller configured to:
       display a first webpage on the touchscreen, the first webpage corresponding to one of a plurality of webpages loaded in order of user inputs;
       control the touchscreen to display a web browser menu of a web browser installed in the mobile terminal;

receive a first user input via the touchscreen, the first user input including one of a first gesture or a second gesture, the first user input made by one of flick gesture or a drag gesture made on a URL editor of the web browser menu;

display an object pertaining to one of a second webpage that was loaded on the touchscreen right before the first webpage, in response to receiving the first gesture, or a third webpage that was loaded on the touchscreen right after the first webpage in response to receiving the second gesture, wherein only one of the objects pertaining to the second webpage or the third webpage is displayed at a given time;

receive a second user input via the touchscreen for selecting the object pertaining to one of the second or third webpages; and re-display one of the second or third webpages according to the second user input, wherein there is no indication of the second or third webpage on the touchscreen while displaying the first webpage.

11. The mobile terminal of claim 10, wherein the controller is configured to execute the web browser installed in the mobile terminal to display the first webpage of the plurality of webpages, and load and re-display, when the object pertaining to one of the second or third webpages is selected, one of the second or third webpages in a state that the web browser is running.

12. The mobile terminal of claim 10, wherein the controller is configured to control display of the object pertaining to one of the second or third webpages on at least part of the first webpage in an overlay manner.

13. The mobile terminal of claim 10, wherein the object is one of a thumbnail image, a title, or a favicon of a corresponding webpage.

14. The mobile terminal of claim 10, the web browser menu including a backward button to navigate to a webpage displayed right before the first webpage and a forward button to navigate to a webpage displayed right after the first webpage.

15. The mobile terminal of claim 10, wherein the controller is configured to:
receive a third user input made onto the web browser menu in a state of displaying the object pertaining to one of the second or third webpages, the third user input including the first gesture or the second gesture, and display an object pertaining to one of a fourth webpage that was displayed right before the second webpage, in response to receiving the first gesture, or a fifth webpage that was displayed right after the third webpage among the plurality of webpages in response to the second gesture.

16. The mobile terminal of claim 15, wherein the object pertaining to one of the fourth or fifth webpages is displayed along with the object pertaining to one of the second or third webpages.

17. The mobile terminal of claim 15, the controller is configured to:
determine whether the third user input is received in a predetermined time duration after receiving the first user input; and
skip, when the third user input is received in the predetermined time duration, a display of the object pertaining to one of the second or third webpages, and display the object pertaining to one of the fourth or fifth webpages.

18. A non-transitory storage medium storing a webpage navigation program that, when executed by a processor, causes the processor to perform processes comprising:
displaying a first webpage on a screen among a plurality of webpages loaded in order of user inputs;
displaying a web browser menu of a web browser installed in a mobile terminal;
receiving a first user input made on the screen, the first user input including one of a first gesture or a second gesture, the first user input made by one of flick gesture or a drag gesture made on a URL editor of the web browser menu;
displaying an object pertaining to one of a second webpage that was loaded on the screen right before the first webpage, in response to receiving the first gesture, or a third webpage that was loaded on the screen right after the first webpage in response to receiving the second gesture, wherein only one of the objects pertaining to the second webpage or the third webpage is displayed at a given time;
receiving a second user input for selecting the object pertaining to one of the second or third webpages; and
re-displaying one of the second or third webpages according to the second user input,
wherein there is no indication of the second or third webpage on the screen while displaying the first webpage.

* * * * *